(12) United States Patent
Nordstrom et al.

(10) Patent No.: US 9,990,385 B2
(45) Date of Patent: Jun. 5, 2018

(54) METHOD AND SYSTEM FOR COLLECTING AND ANALYZING TIME-SERIES DATA

(71) Applicant: Amazon Technologies, Inc., Seattle, WA (US)

(72) Inventors: Paul G. Nordstrom, Seattle, WA (US); Aaron C. Thompson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 14/715,453

(22) Filed: May 18, 2015

(65) Prior Publication Data

US 2015/0248446 A1    Sep. 3, 2015

Related U.S. Application Data

(63) Continuation of application No. 11/375,067, filed on Mar. 14, 2006, now Pat. No. 9,037,698.

(51) Int. Cl.
*G06F 17/30* (2006.01)
*G06F 11/14* (2006.01)
(Continued)

(52) U.S. Cl.
CPC ........ *G06F 17/30312* (2013.01); *G06F 11/00* (2013.01); *G06F 11/1448* (2013.01);
(Continued)

(58) Field of Classification Search
None
See application file for complete search history.

(56) References Cited

U.S. PATENT DOCUMENTS 4,034,347 A    7/1977    Probert, Jr.
4,072,072 A    2/1978    Harb
(Continued)

FOREIGN PATENT DOCUMENTS

CN    105608758 A  *  5/2016
CN    106708989 A  *  5/2017
WO    WO 2013122338 A1 *  8/2013   ....... G06F 17/30584

OTHER PUBLICATIONS

Kitatsuji, Y., et al., A distributed Real-Time Tool for IP-Flow Measurement, IEEE, 2004.
(Continued)

*Primary Examiner* — Steven Snyder
(74) *Attorney, Agent, or Firm* — Knobbe, Martens, Olson & Bear, LLP

(57) ABSTRACT

A computer-implemented data collection and analysis method comprises receiving from a client computing device, at least one data analysis datapoint, adding the received at least one data analysis datapoints to a data structure, and adding an additional data analysis datapoint to the data structure, storing, in a data repository, the data structure further comprising a data processing result, maintaining at least partially consistent copies of the data structure across the plurality of host computers, in response to a request regarding an operation from the client computing device, retrieving the data processing result from the data repository, and providing the data processing result using routing information to the client computing device. The data structure comprises an index of data analysis datapoints from the plurality of host computing devices. A portion of the additional data analysis datapoint is added to the data value to generate a data processing result.

21 Claims, 14 Drawing Sheets

(51) Int. Cl.
 *G06F 11/34* (2006.01)
 *G06F 11/30* (2006.01)
 *G06F 11/00* (2006.01)

(52) U.S. Cl.
 CPC ............ *G06F 11/30* (2013.01); *G06F 11/301* (2013.01); *G06F 11/3495* (2013.01); *G06F 17/30864* (2013.01); *G06F 2201/835* (2013.01); *G06F 2201/875* (2013.01)

(56) References Cited

U.S. PATENT DOCUMENTS

| | | | |
|---|---|---|---|
| 4,077,060 A | 2/1978 | Bodner | |
| 4,130,865 A | 12/1978 | Heart | |
| 4,141,067 A | 2/1979 | McLagan | |
| 4,954,981 A | 9/1990 | Dehner, Jr. et al. | |
| 5,131,041 A | 7/1992 | Brunner et al. | |
| 5,212,788 A | 5/1993 | Lomet | |
| 5,359,724 A | 10/1994 | Earle | |
| 5,394,526 A | 2/1995 | Crouse et al. | |
| 5,444,819 A | 8/1995 | Negishi | |
| 5,519,861 A | 5/1996 | Ryu et al. | |
| 5,551,027 A | 8/1996 | Choy et al. | |
| 5,553,279 A * | 9/1996 | Goldring | G06F 11/1471 707/615 |
| 5,623,600 A | 4/1997 | Ji et al. | |
| 5,640,554 A | 6/1997 | Take | |
| 5,644,751 A | 7/1997 | Burnett | |
| 5,713,017 A | 1/1998 | Lin et al. | |
| 5,796,952 A | 8/1998 | Davis et al. | |
| 5,812,529 A | 9/1998 | Czarnik et al. | |
| 5,822,529 A | 10/1998 | Kawai | |
| 5,826,031 A | 10/1998 | Nielsen | |
| 5,841,980 A | 11/1998 | Waters | |
| 5,862,346 A | 1/1999 | Kley et al. | |
| 5,884,046 A | 3/1999 | Antonov | |
| 5,892,914 A | 4/1999 | Pitts | |
| 5,892,945 A | 4/1999 | Mirchandaney et al. | |
| 5,909,681 A | 6/1999 | Passera et al. | |
| 5,920,697 A * | 7/1999 | Masters | H04L 45/02 709/219 |
| 5,924,096 A | 7/1999 | Draper et al. | |
| 5,926,822 A | 7/1999 | Garman | |
| 5,974,443 A | 10/1999 | Jeske | |
| 5,987,446 A | 11/1999 | Corey et al. | |
| 5,987,466 A | 11/1999 | Greer et al. | |
| 5,999,610 A | 12/1999 | Lin et al. | |
| 6,014,686 A | 1/2000 | Elnozahy et al. | |
| 6,088,659 A | 7/2000 | Kelley | |
| 6,108,703 A | 8/2000 | Leighton et al. | |
| 6,119,165 A | 9/2000 | Li et al. | |
| 6,125,365 A | 9/2000 | Nakatsugawa | |
| 6,128,647 A | 10/2000 | Haury | |
| 6,141,681 A | 10/2000 | Kyle | |
| 6,178,439 B1 | 1/2001 | Feit | |
| 6,199,099 B1 | 3/2001 | Gershman | |
| 6,275,820 B1 | 8/2001 | Navin-Chandra | |
| 6,282,548 B1 | 8/2001 | Burner et al. | |
| 6,311,265 B1 | 10/2001 | Beckerle et al. | |
| 6,400,958 B1 | 6/2002 | Isomursu et al. | |
| 6,430,602 B1 | 8/2002 | Kay et al. | |
| 6,523,064 B1 | 2/2003 | Akatsu et al. | |
| 6,529,953 B1 | 3/2003 | Van Renesse | |
| 6,574,749 B1 | 6/2003 | Parsons | |
| 6,594,682 B2 | 7/2003 | Peterson et al. | |
| 6,678,674 B1 | 1/2004 | Saeki | |
| 6,763,017 B1 | 7/2004 | Buckingham | |
| 6,766,370 B2 | 7/2004 | Glommen et al. | |
| 6,792,458 B1 | 9/2004 | Muret et al. | |
| 6,795,826 B2 | 9/2004 | Flinn | |
| 6,816,907 B1 | 11/2004 | Mei et al. | |
| 6,891,802 B1 | 5/2005 | Hubbard | |
| 6,895,406 B2 | 5/2005 | Fables | |
| 6,978,458 B1 | 12/2005 | Ghosh et al. | |
| 6,981,029 B1 | 12/2005 | Menditto et al. | |
| 6,986,050 B2 | 1/2006 | Hypponen | |
| 7,000,013 B2 | 2/2006 | Mei et al. | |
| 7,035,921 B1 | 4/2006 | Baker | |
| 7,054,867 B2 | 5/2006 | Bosley et al. | |
| 7,076,543 B1 | 7/2006 | Kirti et al. | |
| 7,099,914 B1 | 8/2006 | Hartmann et al. | |
| 7,130,912 B2 | 10/2006 | Nishikado et al. | |
| 7,155,493 B1 | 12/2006 | Weber | |
| 7,216,154 B1 | 5/2007 | Chow et al. | |
| 7,225,362 B2 | 5/2007 | Deily et al. | |
| 7,308,649 B2 | 12/2007 | Ehrich et al. | |
| 7,325,045 B1 | 1/2008 | Manber | |
| 7,523,173 B2 | 4/2009 | Seki et al. | |
| 7,523,191 B1 | 4/2009 | Thomas et al. | |
| 7,624,047 B1 | 11/2009 | Round | |
| 7,676,581 B2 | 3/2010 | Isaacs | |
| 7,895,356 B2 * | 2/2011 | Shiina | H04L 29/06 709/238 |
| 7,904,759 B2 | 3/2011 | Nordstrom | |
| 7,979,439 B1 | 7/2011 | Nordstrom et al. | |
| 8,352,634 B2 * | 1/2013 | Shen | H04L 45/02 709/201 |
| 8,601,112 B1 | 12/2013 | Nordstrom et al. | |
| 8,843,620 B2 * | 9/2014 | Conlon | H04L 63/1416 709/203 |
| 8,953,472 B2 * | 2/2015 | Di Pietro | H04L 41/16 370/252 |
| 9,298,854 B2 * | 3/2016 | Ikawa | G06F 17/30985 |
| 9,311,379 B2 * | 4/2016 | Hursh | G06F 17/30578 |
| 9,361,337 B1 * | 6/2016 | Bhave | G06F 11/3476 |
| 9,665,088 B2 * | 5/2017 | Nixon | G05B 19/418 |
| 2001/0037389 A1 | 11/2001 | Fujimori et al. | |
| 2002/0091752 A1 | 7/2002 | Firlie | |
| 2002/0188522 A1 | 12/2002 | McCall et al. | |
| 2003/0018953 A1 | 1/2003 | Aberg | |
| 2003/0130982 A1 | 7/2003 | Kasriel et al. | |
| 2003/0172054 A1 * | 9/2003 | Berkowitz | G06F 17/30578 |
| 2003/0212788 A1 | 11/2003 | Wilding et al. | |
| 2004/0005873 A1 | 1/2004 | Groenendaal et al. | |
| 2004/0158615 A1 | 8/2004 | Keller et al. | |
| 2004/0172470 A1 * | 9/2004 | Shiina | H04L 29/06 709/224 |
| 2005/0033803 A1 | 2/2005 | Vleet | |
| 2005/0064859 A1 | 3/2005 | Kotzin et al. | |
| 2005/0102292 A1 | 5/2005 | Tamayo et al. | |
| 2005/0137963 A1 | 6/2005 | Ricketts et al. | |
| 2005/0273841 A1 | 12/2005 | Freund | |
| 2005/0273853 A1 | 12/2005 | Oba et al. | |
| 2006/0053334 A1 | 3/2006 | Ingen et al. | |
| 2006/0259585 A1 | 11/2006 | Keohane et al. | |
| 2007/0088805 A1 | 4/2007 | Cyster | |
| 2007/0124446 A1 | 5/2007 | Coulthard et al. | |
| 2007/0263650 A1 | 11/2007 | Subramania et al. | |
| 2008/0086573 A1 | 4/2008 | Martinez et al. | |
| 2008/0250099 A1 * | 10/2008 | Shen | H04L 45/02 709/203 |
| 2008/0263188 A1 | 10/2008 | Awduche et al. | |
| 2010/0071061 A1 | 3/2010 | Crovella et al. | |
| 2011/0202924 A1 | 8/2011 | Banguero et al. | |
| 2012/0144026 A1 * | 6/2012 | Conlon | H04L 63/1416 709/224 |
| 2014/0164324 A1 * | 6/2014 | Hursh | G06F 17/30578 707/613 |
| 2016/0155141 A1 * | 6/2016 | Song | G06Q 30/0242 705/14.41 |
| 2016/0179915 A1 * | 6/2016 | Grebnov | G06F 17/30575 707/624 |
| 2016/0210338 A1 * | 7/2016 | Van Pelt | H04W 4/006 |

OTHER PUBLICATIONS

Andersson, M., et al., Admission Control of the Apache Web Server, <http://www.telecom.lth.se/panda/research/publications/m_andersson_nts2004.pdf>, Proceedings of the 17th Nordic Teletraffic Seminar (NTS'17), Aug. 24-27, 2004, Fornebu, Norway, 12 pages.

(56) References Cited

OTHER PUBLICATIONS

Wessels, D., et al., Application of Internet Cache Protocol (ICP), version 2, National Laboratory for Applied Network Research/ UCSD, <http://icp.ircache.net/rfc2187.txt> [retrieved Jul. 10, 2007], Sep. 1997, 20 pages.

Backward Chaining, The Free On-Line Dictionary of Computing, Oct. 10, 2003.

Mao, Y., et al., Cluster-Based Online Monitoring System of Web Traffic, ACM, 2001.

Demers, A., et al., Epidemic Algorithms for Replicated Database Maintenance, Proceedings of the Sixth Annual ACM Symposium on Principles of Distributing Computing, Aug. 10-12, 1987, Vancouver, British Columbia, Canada, 12 pages.

Wessels, D., et al., Internet Cache Protocol (IPC), version 2, National Laboratory for Applied Network Research / UCSD, <http://icp.ircache.net/rfc2186.txt> [retrieved Jul. 10, 2007], Sep. 1997, 9 pages.

Romeral, R., et al., MIRA: A Distributed and Scalable WAN/LAN Real-Time Measurement Platform, Springer-Verlag Berlin Heidelberg, 2002.

Andersson, M., et al., Modelling and Design of Admission Control Mechanisms for Web Servers Using Non-Linear Control Theory, <http://www.telecom.lth.se/panda/research/publications/m_andersson_itcom2003.pdf, Proceedings of ITCom's Conference on Performance and Control of Next-Generation Communication Networks (ITCOM 2003), Sep. 9-10, 2003, Orlando, Florida, 12 pages.

Barroso, L.A., et al., Web Search for a Planet: The Google Cluster Architecture, IEEE Micro 23(2):Mar./Apr. 22-28, 2003.

\* cited by examiner

METHOD AND SYSTEM FOR COLLECTING AND ANALYZING TIME-SERIES DATA

BACKGROUND

Time-series data is often generated during operation of many types of systems. Time-series data is data that is associated with particular points in time or particular time intervals, often represented in the form of time stamps that are maintained with the data. In many situations, in order to allow analysis to occur, it is desirable to collect the time-series data generated by a system of interest and store the data in a data repository. The system of interest may be any system that can be monitored in some way to provide data for further analysis. For example, the weather, the economy, government and business systems (e.g., factory systems, computer systems, and so on) are all potential examples of systems of interest which may be monitored to provide data for further analysis.

Various solutions have been provided to meet the need for systems which can collect and analyze time-series data. However, present solutions have often proven unsatisfactory, particularly in situations where the data rate of the time-series data is very high or where the quantity of the time-series data is very large. Accordingly, there is a need for improved systems that are capable of efficiently collecting and analyzing time-series data. There is also a need for improved systems that are capable of receiving a serial description of a calculation to be performed, and then automatically decomposing the calculation into many constituent calculations which may be performed in parallel.

Additionally, when time-series data is collected and stored in a data repository, there is often a need to provide access to the time-series data so that a historical analysis of the time-series data can be performed. However, present solutions for providing access to time-series data have often proven slow or impractical, particularly in situations involving large volumes of time-series data. Accordingly, there is also a need for tools which allow large volumes of time-series data to be more easily and efficiently accessed to facilitate historical and/or real-time analysis of the data.

It should be appreciated that, although certain features and advantages are discussed, the teachings herein may also be applied to achieve systems and methods that do not necessarily achieve any of these features and advantages.

SUMMARY OF THE INVENTION

According to another exemplary embodiment, a computer-implemented data processing method comprises receiving information from a user computer concerning a desired output to be generated, adding the information concerning the desired output to be generated to a data structure, and adding additional information to the data structure concerning intermediate outputs to be generated. The information concerning the desired output to be generated is received at a host computer. The host computer is one of a plurality of host computers configured to collect and analyze data received from a plurality of source computers. The data structure represents a list of outputs to be generated by the plurality of host computers. The intermediate outputs are precursor inputs needed to generate the desired output. The additional information is added based on the information received from the user computer and based on stored information.

According to another exemplary embodiment, a system for collecting and processing time-series data from a plurality of data source computers comprises a calculation table, a plurality of computer-implemented nodes, and a plurality of computer-implemented partitions. The calculation table comprises a list of calculation descriptors inserted by a plurality of user computers. The calculation descriptors describe desired outputs of the system. The plurality of computer-implemented nodes have access to the calculation table. The plurality of computer-implemented partitions are owned by the plurality of computer-implemented nodes and comprise time-series processors that process the time-series data. The time-series processors comprise first time-series processors configured to generate the desired outputs described by the calculation descriptors inserted by the plurality of user computers. The first time-series processors have precursor inputs. The first time-series processors are configured to insert additional calculation descriptors in the calculation table. The time-series processors comprise additional time-series processors created in response to the insertion of the additional calculation descriptors in the calculation table by the first time-series processors. The additional time-series processors being configured to generate the precursor inputs for the first time-series processors based on the additional calculation descriptors.

It should be understood that the detailed description and specific examples, while indicating specific embodiments of the present invention, are given by way of illustration and not limitation. Many modifications and changes within the scope of the present invention may be made without departing from the spirit thereof, and the invention includes all such modifications.

DETAILED DESCRIPTION

I. Overview of Exemplary Hardware System

Figure 1:
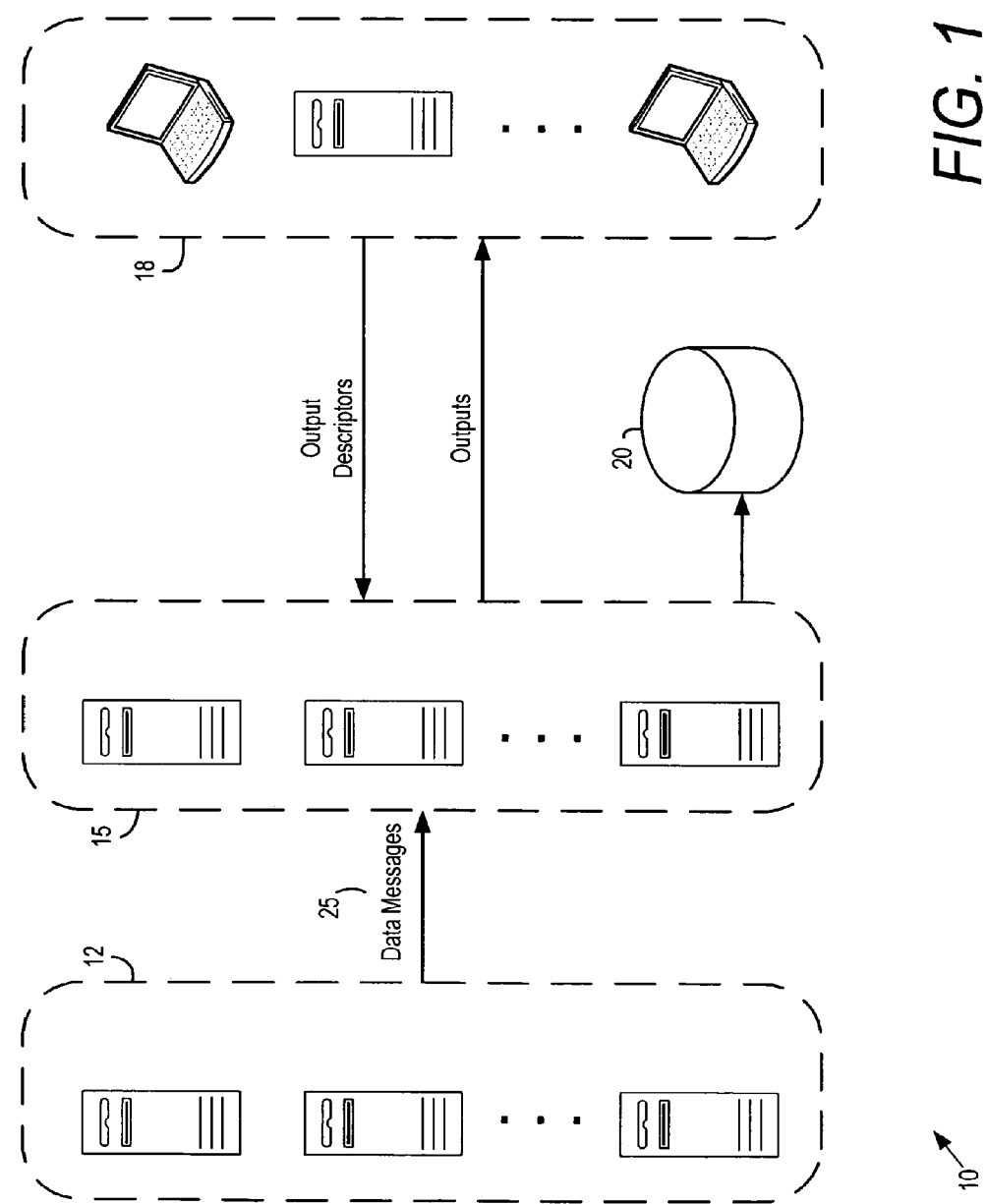
FIG. 1 is a block diagram of a data processing system which utilizes a data collection and analysis system according to an exemplary embodiment.

Referring now to FIG. 1, a data processing system 10 according to an exemplary embodiment is shown. The data processing system 10 comprises data source computers 12, data collection/analysis computers 15, user computers 18, and a data repository 20. The computers 12, 15, and 18 may be connected by one or more networks, such as local area networks, metropolitan area networks, wide area networks (e.g., the Internet), and so on.

The data source computers 12 provide data which is desired to be collected and analyzed and which concerns a system of interest. The data may be provided by the computers 12 based on processing that occurs at the computers 12, based on information received from other sources, and/or in another manner. For example, if the system of interest is a physical process that is desired to be monitored/analyzed (e.g., the weather), the data may come from sources such as weather satellites, weather monitoring facilities, and so on. If the system of interest is partially or entirely computer-implemented (e.g., a computer network implemented in part by the computers 12), the data may be provided based on processing that occurs at the computers 12. For sake of providing a specific example, it will initially be assumed herein that the system of interest is a computer network implemented in part by the computers 12. For example, the computers 12 may comprise one or more clusters of servers that provide web pages to visitors of one or more on-line websites and/or other on-line network services. The group of computers that constitute what is designated as computers 12 in FIG. 1 is assumed to be large, for example, in the hundreds, thousands, or tens of thousands of computers. Of course, it will be appreciated that a significantly smaller or significantly larger number of computers may also be used.

The data provided by the computers 12 is time-series data. As previously indicated, "time-series data" is data which is associated with a particular time interval, often represented in the form of time stamps that are maintained with the data. It is referred to time-"series" data because there is typically (though not always) a series of data points in a set of time-series data. (Herein, the "time interval" may be the degenerate case where the beginning of the interval and the end of the interval are the same, i.e., a single point in time.) Because the number of computers 12 is assumed to be large, it may also be assumed that the data rate at which the computers 12 generate the time-series data is correspondingly large. For example, in the context of an on-line website, the computers 12 may be rendering thousands or millions of web pages or more per second. The time-series data generated by the computers 12 in this context may include not only the web pages themselves, but also related performance metrics and other data concerning the manner which the web pages were generated. It may also be assumed that the exact composition of the computers 12 is constantly changing over time, given that particular ones of the computers 12 may go off-line (e.g., fail) and/or given that particular ones of the computers 12 may or may not have data to send at any given time (depending for example on what is happening in the system of interest).

The computers 15 collect and process the data provided by the computers 12. The data may be received by the computers 15 from the computers 12 in the form of data messages. The term "data message" is used to refer to any data that is received from data source computers or elsewhere, regardless whether the data conforms to a particular message specification. The term "datapoint" is more specific and is used to refer to a data message that includes a datakey, a data value, and a data interval, as described below. The datapoint is the unit of data processed and stored by the computers 15. The data messages from the computers 12 may or may not be in the form of datapoints, depending on the configuration of the computers 12 and whether the computers 12 have been programmed to send data in the form of datapoints. If the data messages are not in the form of datapoints, the computers 15 may use the data messages to construct datapoints. In an exemplary embodiment, there is a one-to-one correspondence between data messages and datapoints, e.g., data messages are received at the computers 15 and then converted to datapoints. In other embodiments, there is not a one-to-one correspondence between data messages and datapoints. For example, a data message may comprise data which is accumulated at the computers 12, transmitted to the computers 15 in the form of a bulk transfer, and then decomposed at the computers 15 to produce many datapoints. As another example, multiple data messages may be combined at the computers 15 to produce a datapoint. In another exemplary embodiment, the data messages from the computers 12 may also include information identifying a source of the data message, such as an identification of a specific one of the computers 12.

The group of computers that constitutes what is designated as computers 15 in FIG. 1 may, for example, be deployed in the form of a cluster of servers. The number of computers in the group may be determined based on the data rate of the data provided by the computers 12 and may also be large (though, potentially, not as large as the number of computers in what is designated as computers 12 in FIG. 1). Again, it is assumed that the exact composition of the computers 15 may be changing over time.

The outputs of computers 15 may include datapoints and notifications. Datapoints may be computed from real-time data inputs from the data source computers 12, from data files, and/or from cached values in the data repository 20. The computation of datapoints is triggered by the insertion of a calculation descriptor in a calculation table 48 (see FIG. 2), as will be described in greater detail below in connection with FIG. 7. Notifications occur during the processing of a datapoint and due to the triggering of a threshold. Notifications may also occur due to the passage of time (e.g., an elapsed timer). A threshold is a rule for determining events of interest and may comprise a predicate that is calculated after processing of a datapoint, after the passage of time, and/or in response to other rules. Whenever the value of the predicate changes, a notification may be sent to the computers 18. In an exemplary embodiment, notifications are implemented as a specific type of datapoint.

The user computers 18 may be used by users (e.g., human users, data analysis computers, and/or other users) to access the outputs of the data collection/analysis computers 15. The computers 18 are shown by way of example to comprise one or more laptop computers for human use and one or more servers for automated analysis. The computers 18 may perform additional analysis of the outputs to generate additional data, notifications, and so on. As will be described below in connection with FIG. 7, the calculation table 48 may be modified by the computers 18 to allow the computers 18 to specify desired outputs of the computers 15.

Although the computers 12, the computers 15 and the computers 18 are shown as being separate and serving separate functions, it will be understood that the same physical computer may serve multiple functions within the system 10. For example, a given server may be running a process that supports the data collection/analysis function described as being performed by the computers 15 and may simultaneously be running another process that supports other user analysis functions described as being performed by the computers 18. Similarly, a given server that provides data messages to the computers 15 may also use results of the analysis performed on the data messages.

The data repository 20 is configured to store and retrieve the datapoints. Whenever any datapoint is complete, the datapoint may be provided to one of the user computers 18, stored in the data repository 20, and/or forwarded internally for further processing. If the datapoint is stored in the data repository 20, a globally unique ID (GUID) may be generated. The data repository 20 makes the datapoints available for subsequent retrieval and analysis using the GUID. For example, the computers 18 may access datapoints stored in the data repository 20 via the computers 15. The data repository 20 may, for example, be a storage area network, a database system, or other suitable system. Although a single data repository 20 is shown which is separate from the computers 15, it will be appreciated that the data repository 20 may be provided in other configurations. For example, the data repository 20 may comprise multiple data repositories, may comprise a distributed data repository with portions distributed across the computers 15, and so on.

II. Exemplary Data Collection/Analysis System

A. Nodes, Worker Processes, and Partitions

Figure 2:
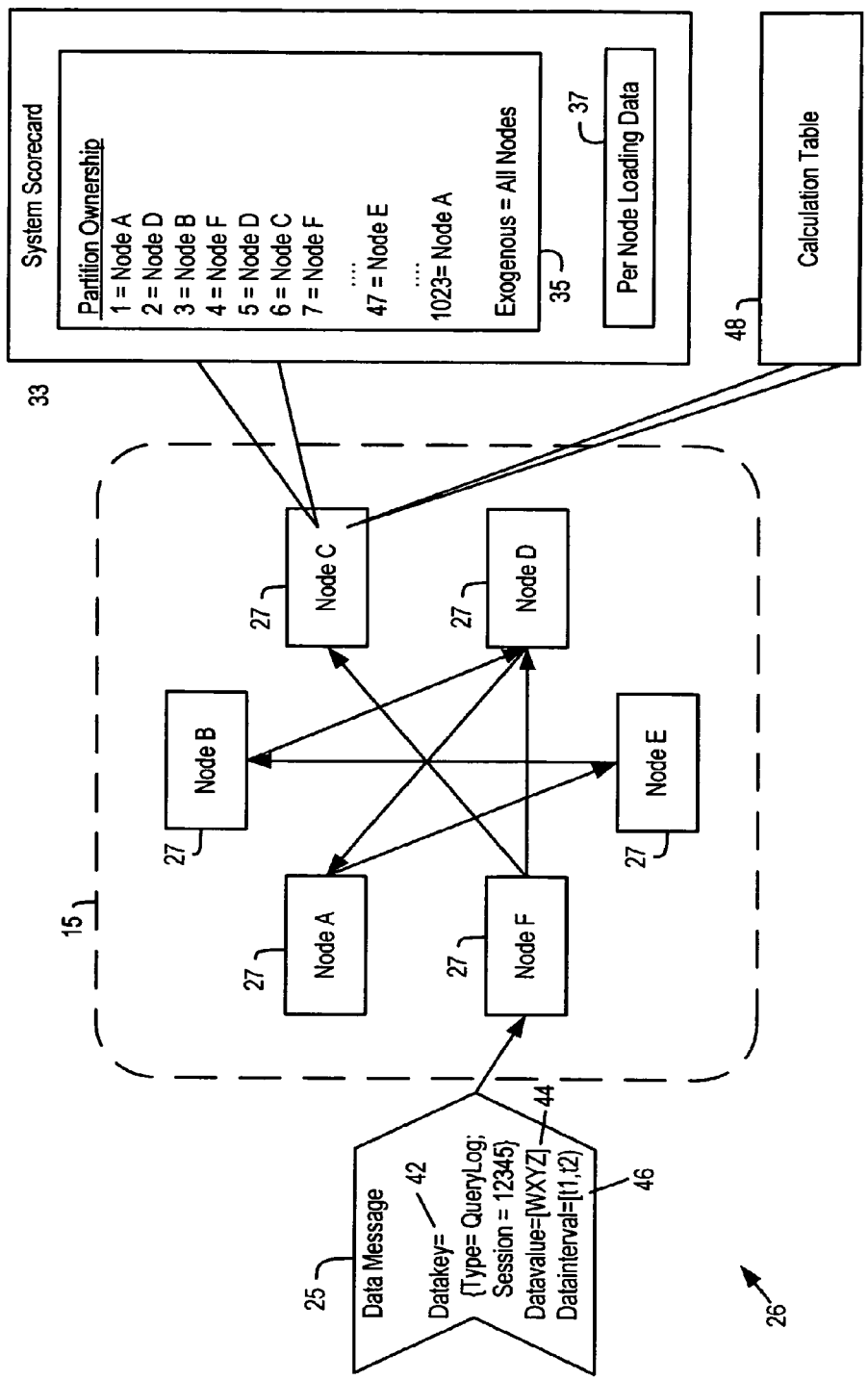
FIG. 2 is a block diagram showing the data collection and analysis system of FIG. 1 in greater detail.

Referring now to FIG. 2, a data collection/analysis system 26 implemented by the computers 15 is shown in greater detail. In FIG. 2, the data collection/analysis system 26 is shown as comprising multiple nodes 27. In an exemplary embodiment, each node 27 is implemented by one of the computers (e.g., servers) 15 of FIG. 1. In other embodiments, there is not a one-to-one correspondence between the computers 15 and the nodes 27. For example, multiple nodes may be implemented on one server or a node may span multiple servers. Although only a few nodes are shown for sake of simplicity, it will be appreciated that the system 26 may comprise many additional nodes.

The data collection/analysis system 26 is implemented using a plurality of endogenous partitions 60 (see FIG. 4) which are distributed across the nodes 27. The partitions 60 are used to distribute workload across the nodes 27. Each node 27 stores a system scorecard 33 which includes a partition table 35 that describes the current (real-time) state of the system 26 with regard to the allocation of partitions 60 to nodes 27. In an exemplary embodiment, the system scorecard 33 maintains a list of which partitions 60 are owned by which nodes 27 for all partitions 60 and nodes 27. In another exemplary embodiment, system 26 is configured to have a default allocation of partitions 60 to nodes 27, and the system scorecard 33 only maintains a list of exceptions to the default allocation (that is, a list of partitions 60 and associated nodes 27 which do not conform to the default allocation). Although, for sake of simplicity, the system scorecard 36 is only shown in association with Node C in FIG. 2, the system scorecard 33 is stored at each of the nodes 27 in an exemplary embodiment. In the example of FIG. 2, the system 26 comprises 1023 of the partitions 60 distributed across the nodes 27. As will be appreciated, the number of partitions may be larger or smaller depending on a variety of factors, including the number of nodes 27 and the level of granularity into which it is desired to break down computations to be performed by system 26. Assuming the number of partitions 60 is fixed as part of the configuration of system 26, it may be desirable to configure the system 26 such that the number of partitions 60 is much larger than is expected to be used. In another embodiment, the system 26 may be made dynamically repartitionable such that the number of partitions is not fixed.

As shown in the partition table 35, the partitions 60 are each owned by one of the nodes 27. Each of the nodes 27 also owns zero or more exogenous partitions 70 (see FIG. 5). Herein, for purposes of discussion, it will be assumed that each node 27 owns one exogenous partition 70. The partition 70 is referred to as the "exogenous" partition because it is responsible for receiving exogenous data messages. The term "exogenous data message" is used to refer to data messages received by the computers 15 from the computers 12. The partitions 60 are sometimes referred to herein as "endogenous" partitions because they receive only endogenous datapoints. The term "endogenous datapoint" is used to refer to data messages received by the computers 15 from another one of the computers 15. Endogenous datapoints may, for example, be received from the exogenous partition 70 or from one of the partitions 60 of another one of the computers 15. Ownership of the partitions 60 may change throughout operation of the system 26. For example, if one of the nodes 27 fails, one or more of the remaining nodes 27 may take over ownership of the partitions 60 owned by the failed node. Ownership of the partitions 60 may also change in order to more evenly balance workload between the nodes 27. In other embodiments, some of the nodes 27 may own zero exogenous partitions 70. For example, a node 27 that is overloaded may drop connections with exogenous data sources in order to reduce load. As another example, some nodes 27 may be configured to have only exogenous partitions 70 and other nodes 27 may be configured to have only endogenous partitions 60. A node 27 that is configured with only exogenous partitions 70 may be more readily able to take over for a failed node 27 because it can readily create available capacity by dropping connections with data source computers 12. Accordingly, such an arrangement facilitates failure recovery. Additionally, the dropping of connections temporarily shifts load to the data source computers 12 because the exogenous data is temporarily held in queue by the data source computers 12 while the data source computers 12 find new connections. Thus, the dropping of the connection itself helps with the overloading. Further, as described below, the system 10 may be configured such that connections between the data source computers 12 and the nodes 27 are dynamically changing. Accordingly, losses of connections with nodes 27 may be a routine event from the perspective of the data source computers 12, and may be addressed in routine fashion when a particular node 27 drops a connection for purposes of performing failure recovery.

Given that node ownership may be constantly changing, it may be desirable for the information in the scorecard 33 including the partition table 25 to remain consistent across the nodes 27. The scorecard 33 may be kept consistent across nodes, for example, using a gossip protocol. Gossip protocols, sometimes also referred to as epidemic protocols, spread information on a network by having each host on the network talk to some other host or hosts at random, repeatedly, until all the hosts on the network learn the information. A centralized server is not necessary to disseminate information. Also, as will be appreciated, there need not be one "master" copy of the system scorecard 33 that is maintained at a particular node 27. Rather, each node 27 may contain a copy of the system scorecard 33 and each copy of the system scorecard 33 may be continuously converging towards consistency with all of the other versions of the scorecard 33 maintained at other nodes 27. As long as the nodes 27 converge on a consistent version of the information in the scorecard 33, the system 26 is relatively insensitive to reasonably short-lived differences between various node views of the information contained in the scorecard 33. In other embodiments, other arrangements are used. For example, the system scorecard 33 may be maintained at a central location, and the nodes 27 may periodically request updated copies or may be automatically sent updated copies when changes occur.

In FIG. 2, a data message 25 is shown as being received at one of the nodes 27 (namely, Node F). The data message 25 comprises a datakey 42, a data value 44, and a data interval 46. The datakey 42 provides information which allows the datapoint 40 to be routed within the data processing system 26. For exogenous data messages, the data message is sent to the exogenous partition 70 within the recipient node 27. A partition number may then be calculated from another data element the datakey 42 (e.g., such as session ID). Once calculated, the partition number may then be included with endogenous datapoints and used to identify the physical machine(s) (which comprises a node, which comprises the corresponding partition) responsible for processing the datapoint.

Any element in the data that enables different sets of time-series data to be differentiated from each other may be used to calculate the partition number, and multiple data elements may be used in situations where the data is to be routed to multiple different partitions for different types of processing. For example, the datakey 42 may be generated based on session ID (e.g., or visitor ID) where the system of interest is an on-line system and where the data processing system 26 is performing data processing based on session ID. The datakey 42 may also be generated based on other information, such as product ID where the data processing system 26 is performing data processing based on product ID. As will be appreciated, the processing based on session ID may be occurring at generally the same time as processing based on product ID. Further, the nature of the data processing that is being performed may change based on the contents of the calculation table 48 and the data source computers 12 need not necessarily know whether the data processing system 26 is performing data processing based on session ID or product ID or both. It may be desirable for the selected data element to spread the datapoints across the partition space so that the partitions 60 are evenly loaded. Although the datakey 42 is shown as being separate from the data value 44, it will be appreciated that the information used to route the datapoint may simply be extracted from the data value 44 without using a separate datakey.

In an exemplary embodiment, each of the node control processes 52 and each of the worker processes 54 within each of the nodes 27 has a copy of a calculation table 48. Herein, the term "table" is used to refer to any data structure that may be used to store information. In an exemplary embodiment, the calculation table 48 comprises a list of calculation descriptors which reflect all the calculations being performed in the system 26. For each calculation descriptor in the calculation table 48, information is stored indicating what data is needed to perform the calculation. After producing a datapoint, each worker process 54 is able to examine the calculation table 48 and determine that the datapoint is an input to a calculation that is listed in the calculation table 48. The calculation table 48 also stores information indicating how the routing should be performed for the datapoint (e.g., "hash on the session ID, and then send to the partition identified by the hashing operation"). The datapoint may then be routed in accordance with the information in the calculation table 48. A datapoint router object (not shown) may be associated with the calculation table and may manage this process. For example, there may be one router object created for each input for each calculation listed in the calculation table. A given datapoint may be routed to one partition, to multiple partitions, or to all partitions. For example, the datapoint may be routed to all partitions where the datapoint contains system status information of interest to all partitions. The calculation table 48 is described in greater detail below.

In an exemplary embodiment, a data envelope arrangement is used to route endogenous datapoints to endogenous partitions. The partition number is used as an address on the data envelope, and the data envelope contains the endogenous datapoint (or, more particularly, a pointer to the datapoint). This permits one datapoint to be placed in several different data envelopes at the same time and routed to different partitions 60. If a datapoint is being sent to multiple partitions 60 at the same node 27, then, for example, one envelope may be used for the multiple partitions. On the other hand, if the multiple partitions 60 are on different nodes 27, then different envelopes may be used for the different partitions 60. Data envelopes may be created by any process that is creating and sending datapoints (i.e., regardless whether the process resides in an exogenous partition 70 or an endogenous partition 60).

The datakey 42 also provides information concerning how and where the data needs to be processed. In particular, the datakey 42 provides information concerning the type of data in the datapoint 40. For example, in FIG. 2, the "Type=QueryLog" statement indicates that the data value is a querylog record. (Herein, the term "querylog record" is used to refer to a log record comprising data generated by the computers 12. The log record may, for example, pertain to a response to a query made by a visitor to a website for information.) The "Session=12345" statement provides additional information which enables the data to be routed to the correct partition for processing, i.e., where the routing is performed based on session ID.

The data value 44 is the data to be processed. The nature of the data in data value 44 is dependent on the nature of the system of interest that is being monitored. The data interval 46 is a time interval [t1, t2) which is associated with the datapoint 40. The start point t1 and the end point t2 of the interval may both occur in the past, may occur in the past and in the future, or may both occur in the future. The start point t1 and the end point t2 of the interval may occur at the same time (t1=t2), that is, the data interval may be instantaneous.

The data message in FIG. 2 is an exogenous data message. Exogenous data enters the data processing system 26 through the exogenous partition 70 of a respective node 27. As previously indicated, for exogenous data messages, a partition number is not expected to be included in the data message. The fact that the computers 12 do not need to specify a partition number in data messages means that the computers 12 do not need to know which node 27 is the proper recipient for the data message being sent. This enhances scaleability of the system 26.

In an exemplary embodiment, datapoints are used not only to communicate externally-derived data between the nodes 27, but also other control and status information that is communicated between the nodes 27, such as information concerning nodes failing or coming on-line, information concerning the initiation and completion of calculations, loading information, information about the system scorecard 33 (e.g., initialization information and update information), information about outputs to be produced by the system 26 (e.g., calculation table information, calculation descriptor information, notifications concerning the insertion of calculation descriptors) and so on. Datapoints may be sent from one node 27 to another node 27, to a group of nodes 27, to a partition 60 within a node 27, to a group of partitions 60 within nodes 27, to all other nodes 27, and/or to another type of recipient or set of recipients. Control messages, status messages, and other information transmitted in the form of datapoints may all be processed by datapipe-time-series processor pairs 64 (see FIG. 4) in the same manner as datapoints derived from exogenous data, as described below. This allows the infrastructure that the data processing system 26 puts in place for processing exogenous data to be leveraged for processing internal control messages and status messages. Datapoints may be communicated between nodes 27 using a variety of network communication protocols, such as TCP connections and/or other protocols which provide a greater degree of scaleability or other advantages.

As shown in FIG. 2, the scorecard 33 also stores data 37 concerning per node loading. As previously indicated, ownership of the partitions 60 may change in order to more evenly balance workload between the nodes 27. The nodes 27 each monitor the per node loading data 37 and, if it is determined that there is another node 27 which is more heavily loaded, then the less heavily loaded node 27 may take over or receive ownership of one or more of the partitions 60 from the more heavily loaded node 27. If the more heavily loaded node 27 has multiple partitions 60, the less heavily loaded node 27 may take over partitions 60 that are performing the least amount of work at the more heavily loaded node (i.e., to avoid overloading the node 27 that is receiving the additional workload). This arrangement may also be used during start-up. That is, initially, the first node 27 owns all the partitions 60. As new nodes 27 come on-line, the new nodes 27 obtain a copy of the scorecard 33 and acquire any currently unassigned partitions 60. If there are no unassigned partitions 60, or if the new nodes 27 otherwise remain less heavily loaded than any existing nodes 27 that are already on-line, then the new nodes 27 take over ownership of some partitions 60 from the existing nodes 27 or establish more connections with the data source computers 12. In another exemplary embodiment, during start-up, there is an initial period in which nodes come on-line and partitions are divided among nodes 27 (e.g., according to a default partition assignment), followed by a period in which partitions are reallocated based on loading as appropriate. Other arrangements for assigning partitions during startup may also be used.

In another exemplary embodiment, connections between the nodes 27 and the computers 12 may change in order to more evenly balance workload between the nodes 27. For example, a node 27 that is heavily loaded may stop accepting new connections and/or drop existing connections with one or more of the computers 12. When rejecting or dropping a connection, the node 27 may first confirm that one or more other nodes 27 exist which have capacity to take on additional load, and then provide the computer 15 with a list of alternative nodes 27.

As previously indicated, a node 27 may span multiple servers. For example, it may be desirable for a node 27 to span multiple servers where a particular server is CPU-constrained or bandwidth-constrained. For example, when a server comes on-line, it may detect that another server is CPU-constrained (based on loading information), and it may then cooperate with that server to implement a particular node. For example, if a node 27 is operating at 90% CPU capacity but only 10% network bandwidth capacity, then a new server may become a child server for that node 27. Thus, the system 26 may be capable of dynamically rearchitecting itself to allocate hosts to nodes, whether that be one node per host, multiple nodes per host, or multiple hosts per node.

Also shown in FIG. 2 is a calculation table 48 which specifies the current set of outputs that are required at any given time. As will be described in greater detail below, the calculation table 48 drives operation of the system 26. Again, although the calculation table 48 is only shown in association with Node C, it will be apparent that a consistent copy of the calculation table 48 is maintained at each of the nodes 27. The calculation table 48 comprises a list of calculation descriptors representing desired outputs. Users may specify the processing to be performed by the system 26 by providing information useable to generate calculation descriptors for insertion into the calculation table 48. For example, a user computer may provide a calculation specification (e.g., in the form of a datapoint) which specifies a calculation to be performed, and the system 26 may create a calculation descriptor based on the calculation specification and insert the calculation descriptor in the calculation table 48. As another example, a user may provide a calculation specification (e.g., in the form of a datapoint) which species the circumstances under which a notification is to be produced, and the system 26 may create a calculation descriptor (e.g., a notification descriptor) based on the calculation specification and insert the calculation descriptor in the calculation table 48. The components required to produce those outputs are then instantiated. As will be described in greater detail below, each calculation descriptor specifies the information necessary to construct a time-series processor to generate the required output, and additional system-generated calculation descriptors may be added to the calculation table 48 automatically as a result of the user-specified calculation descriptors. As in the case of the system scorecard 33, the calculation table 48 may be kept consistent across nodes using a gossip protocol or other arrangement. Again, there need not be one "master" copy of the calculation table 48 stored anywhere. As long as the nodes 27 converge on a consistent version of the information in the calculation table 48, the system 26 is relatively insensitive to reasonably short-lived differences between various node views of the information contained in the calculation table 48.

Figure 3:
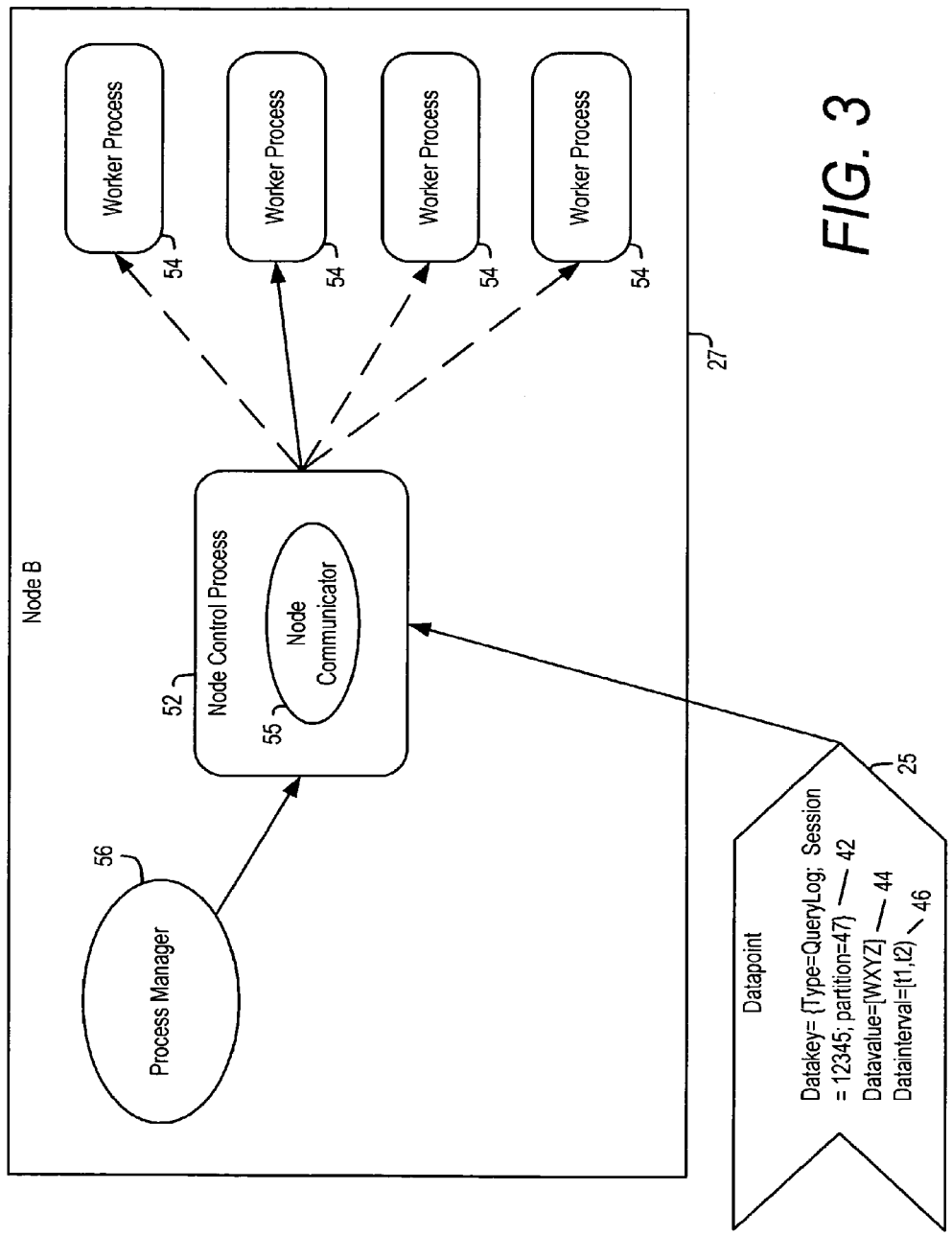
FIG. 3 is a block diagram showing a node of FIG. 2 in greater detail.

Referring now to FIG. 3, one of the nodes 27 is shown in greater detail. Each of the nodes 27 comprises a node control process 52 and one or more worker processes 54. In an exemplary embodiment, the system 26 is an object-oriented system. Accordingly, the node control process 52 and the worker processes 54 are instances of object classes.

In an exemplary embodiment, there is one node control process 52 per node 27 (or host). The node control process 52 controls operation of the node 27. The node 27 may start operation with one or more worker process 54 and may add worker processes 54 as additional work (e.g., additional partitions) is acquired. Each worker process 54 is responsible for the workload associated with one or more partitions. The relationship between worker processes 54 and partitions 60 is configurable. In an exemplary embodiment, there is one worker process 54 per partition 60. In other embodiments (e.g., as in FIG. 4), there is one worker process 54 for multiple partitions 60. For example, a worker process 54 may include one or more endogenous partitions 60 and one or more exogenous partitions 70 (e.g., where there is more than one exogenous partition 70 per node 70). In another exemplary embodiment, separate worker processes may be used for endogenous partitions 60 and exogenous partitions 70. Accordingly, in this embodiment, if a worker process 54 partition includes an exogenous partition 70, it may not include any other partitions (i.e., unless there is more than one exogenous partition 70 per node 27). Assuming there are multiple worker processes per partition, the number of worker processes may be fixed or dynamically configurable (e.g., based on resource consumption by individual ones of the worker processes). In one embodiment, the number of worker processes 54 is dynamically optimized to maximize the through-put of the node 27.

The node control process 52 receives datapoints (e.g., or data envelopes) from other nodes 27 and forwards the datapoints to a node communicator 55. The node communicator 55 determines which of the worker processes 54 is the proper recipient of the data message based on the partition number, if present. For messages being sent to other nodes, the node communicator 55 performs the partition calculation for the messages based on the datakey 52 of the message. The node communicator 55 then forwards the datapoint to the appropriate worker process 54 at the relevant partition 60. The node communicator 55 also performs dynamic load management when assignments of partitions 60 are received from other nodes 27 by assigning the received partitions to worker processes 54.

Each of the nodes 27 also comprises a process manager 56. The process manager 56 is responsible for start-up functions. For example, when a node 27 is put into service, the process manager 56 process may be started and may create the node control process 52. Further behavior of the node 27 may then be determined based on the contents of the calculation table 48.

Figure 4:
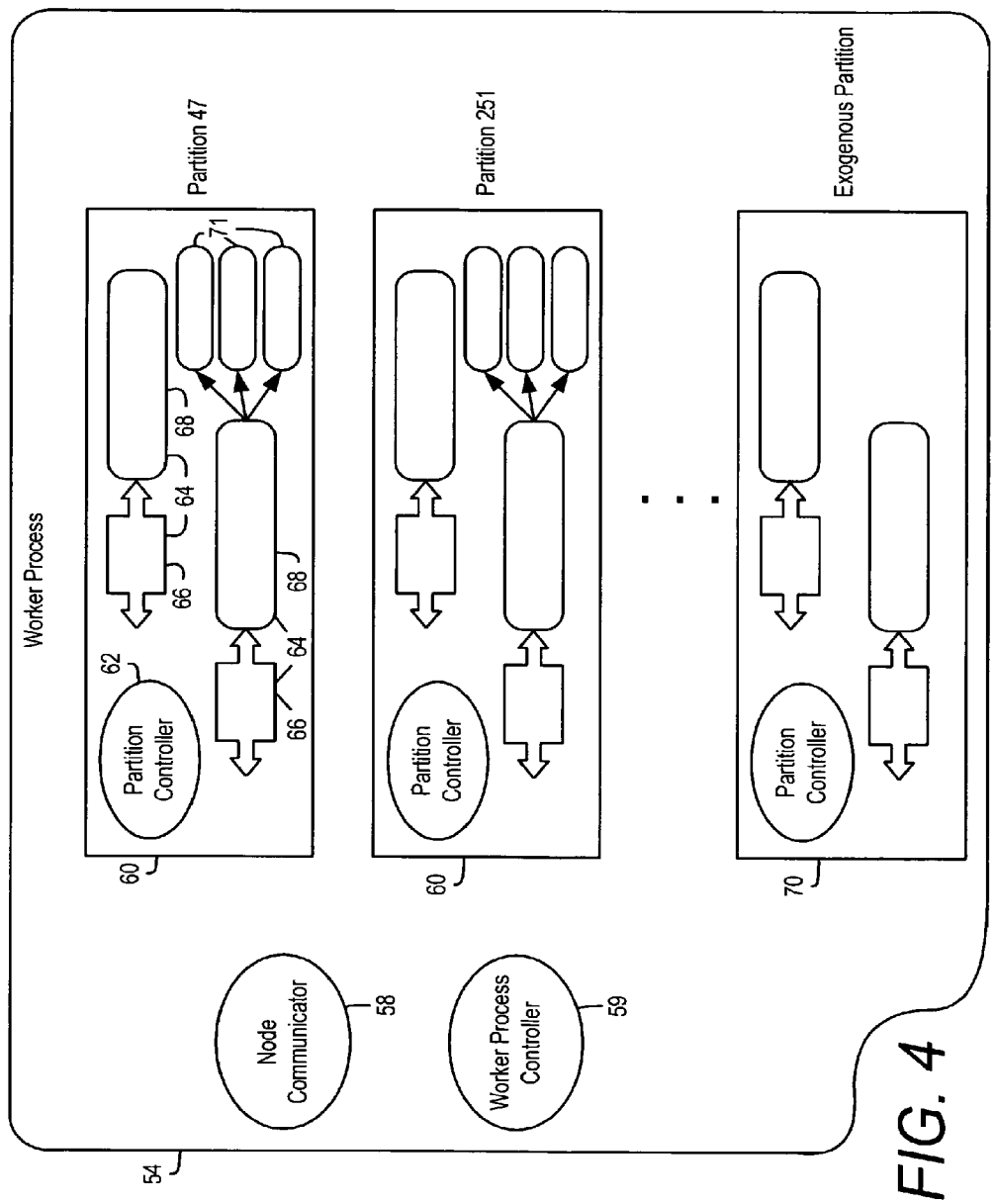
FIG. 4 is a block diagram showing a worker process of FIG. 3 in greater detail.

Referring now to FIG. 4, one of the worker processes 54 is shown in greater detail. Each worker process 54 comprises a node communicator 58, a worker process controller 59, and one or more partitions 60. The node communicator 58 is responsible for creation of the partitions 60 and for handling communications between the partitions 60 across the nodes 27. The node communicator 58 is an instance of the same object class as the node communicator 55, but implements functionality that is relevant at the level of a given worker process 54. The node communicator 58 serves as a process representative for the node 27, and manages communication of datapoints (e.g., or data envelopes) to and from other partitions 60 for other processes using the partition table 33. When sending a datapoint to another node 27, the node communicator 58 does so by forwarding the datapoint to its local node control process 52. In this scenario, the datapoint is marked for transport to another node 27. On the other hand, when the node communicator 58 is sending a datapoint to another partition 60 in the same node, the node communicator 58 forwards the datapoint directly to the corresponding node communicator 58 for the other partition 60.

The worker process controller 59 manages the worker process 54 and responds to control message information from the node control process 52. For example, the worker process controller 59 may construct partition controller objects 62 responsive to control message datapoints received from the node control process 52. There may, for example, be a one-to-one relationship between worker process controllers 59 and worker process 54.

Each partition 60 comprises a partition controller 62 and one or more datapipe-time-series processor pairs 64. The partition controller 62 and the members of datapipe-time-series processor pairs 64 are each instances of object classes. The partition controller 62 manages per-partition functionality, including managing the datapipe-time-series processor pairs 64 and managing interaction with the calculation table 48 for the respective partition 60.

For exogenous partitions, the datapipe-time-series processor pairs 64 are constructed by the partition controller 62 in response to the insertion of a calculation descriptor in the calculation table 48. For endogenous partitions, the datapipe-time-series processor pairs 64 are constructed by the partition controller 62 in response to receipt of data to be processed. For example, if a calculation descriptor is inserted in the calculation table 48 which causes log records to be indexed for visitors, the datapipe-time-series processor pair 64 constructed for processing data for a particular visitor is constructed when data is received relating to the particular visitor. For historical analysis, the datapipe-time-series processor pairs 64 may be constructed by the partition controller 62 in response to the insertion of a calculation descriptor in the calculation table 48. In another exemplary embodiment, a separate component may be used to acquire historical data, and datapipe-time-series processor pairs for historical data may operate in the same manner as datapipe-time-series processor pairs for exogenous data.

The datapipe-time-series processor pairs 64 comprise a datapipe 66 and a time-series processor 68. The datapipe 66 manages the acquisition of the input data needed to perform a desired computation by its partner time-series processor 68 as specified by one of the calculation descriptors in the calculation table 48. This data may come from any appropriate data source, such as flat files, databases, a real-time input, a replay of a real-time input, and so on. To acquire the data, the datapipe 66 may first look for a precomputed (or cached) copy of the input data specified by the calculation descriptor. The datapipe 66 may locate a complete or partial copy of the input data. If not all required data is available, the datapipe 66 acquires the data by using one or more of the following mechanisms (as appropriate): reading from flat files, "listening" for real-time input values, or inserting calculation descriptors in the calculation table 48 to prompt the creation of other datapipe-time-series processor pairs 64 to compute precursor datapoints (as described in greater detail below).

A datapipe 66 in an exogenous partition 70 may be configured to use a client-specific data transfer protocol to receive data messages from the data source computers 12. If the computers 12 have been programmed to use the protocol of the data collection and analysis computers 15, then a generic datapipe class may be used for the data acquisition. Otherwise, a custom exogenous datapipe may be used that is compatible with the communication protocol understood by the client. The responsibility of a datapipe-time-series processor pair 64 in the exogenous partition 70 is to acquire exogenous data and convert the exogenous data into endogenous datapoints. The datapoints so produced are then provided to the partition(s) 60 responsible for processing for processing the datapoint. The calculation table 48 includes (as necessary) calculation descriptors that include the information needed to construct the datapipe-time-series processor pairs 64 in the exogenous partition 70. Effectively, this may be used to trigger the acquisition of all incoming data needed in connection with the calculations to be performed as described in the calculation table 48. A datapipe in a partition 60 may be an instance of a generic datapipe class. Its constructor is parametrized with all the information needed to make the data requirement well-defined. The information needed may vary for the various subclasses of the datapipe class.

The time-series processors 68 are constructed in tandem with their partner datapipes 66. The time-series processor 68 is an object that knows how to process one or more datapoints in some useful way. The time-series processor 68 may perform a logical or physical aggregation of data. For example, a time-series processor 68 may be used to calculate the sum of a series of input values across an interval and emit the result at the end of its interval. The output of a time-series processor 68 is one or more datapoints. By employing a separate datapipe and time-series processor, the issue of what data to process (and where that data comes from) is decoupled from the issue of how to process the data. As will be seen below, this allows real-time analyses, historical analyses, and future projections based on simulations to be implemented in generally the same fashion.

A datapipe-time-series processor pair 64 exists for a specified time interval, but the time interval may be fixed or computed. For example, the time interval may be one hour in length, or may extend to infinity. Alternatively, if the datapipe-time-series processor pair 64 computing the average latency of the next 100 calls to a particular service, its interval would begin at the time it was constructed, and end at whatever time the data was received for 100th call. At the end of the specified time interval, the datapipe-time-series processor pair 64 may either simply terminate or it may be regenerated. For example, if it is desired to calculate the total count of calls to a service (e.g. for a report), then a datapipe-time-series processor pair 64 may be constructed which manages the desired computation, emits the desired values, and then terminates. On the other hand, for an ongoing computation of calls to a service within an hour of the clock (e.g., for a metering service), a datapipe-time-series processor pair 64 may be constructed to manage the computation for calls during a one-hour time period, terminate, and then immediately thereafter be regenerated to manage the computation for calls during the next one-hour time period. Whether the datapipe-time-series processor pair 64 should regenerate itself may be a user-specified parameter of the calculation descriptor that causes the datapipe-time-series processor pair 64 to be created. The datapipe-time-series processor pair 64 may be regenerated by the partition controller 62 according to the same rules that caused the previous datapipe-time-series processor pair 64 to be generated (e.g., in response to the receipt of data).

Figure 5:
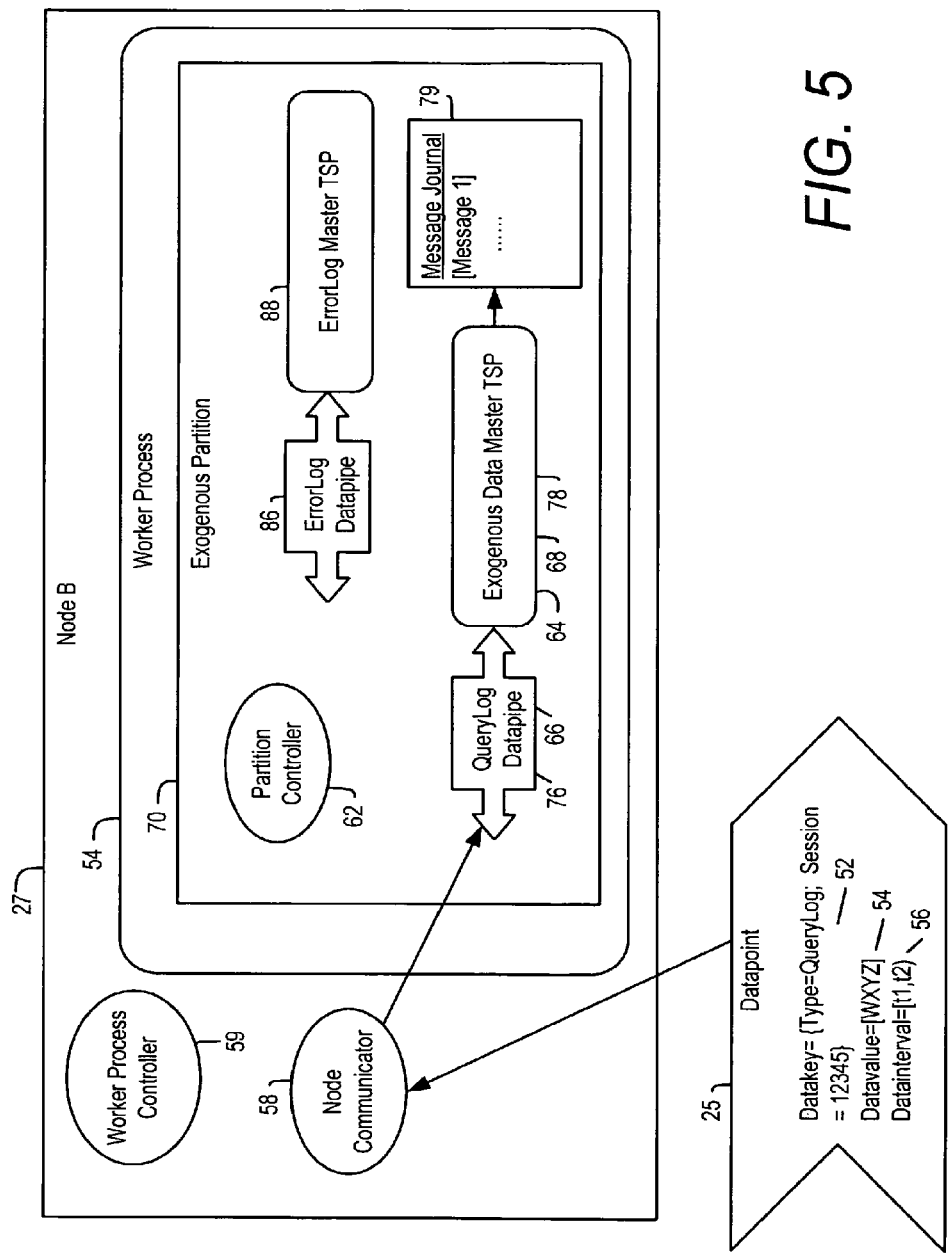
FIG. 5 is a block diagram showing an exogenous partition in greater detail.
Figure 6:
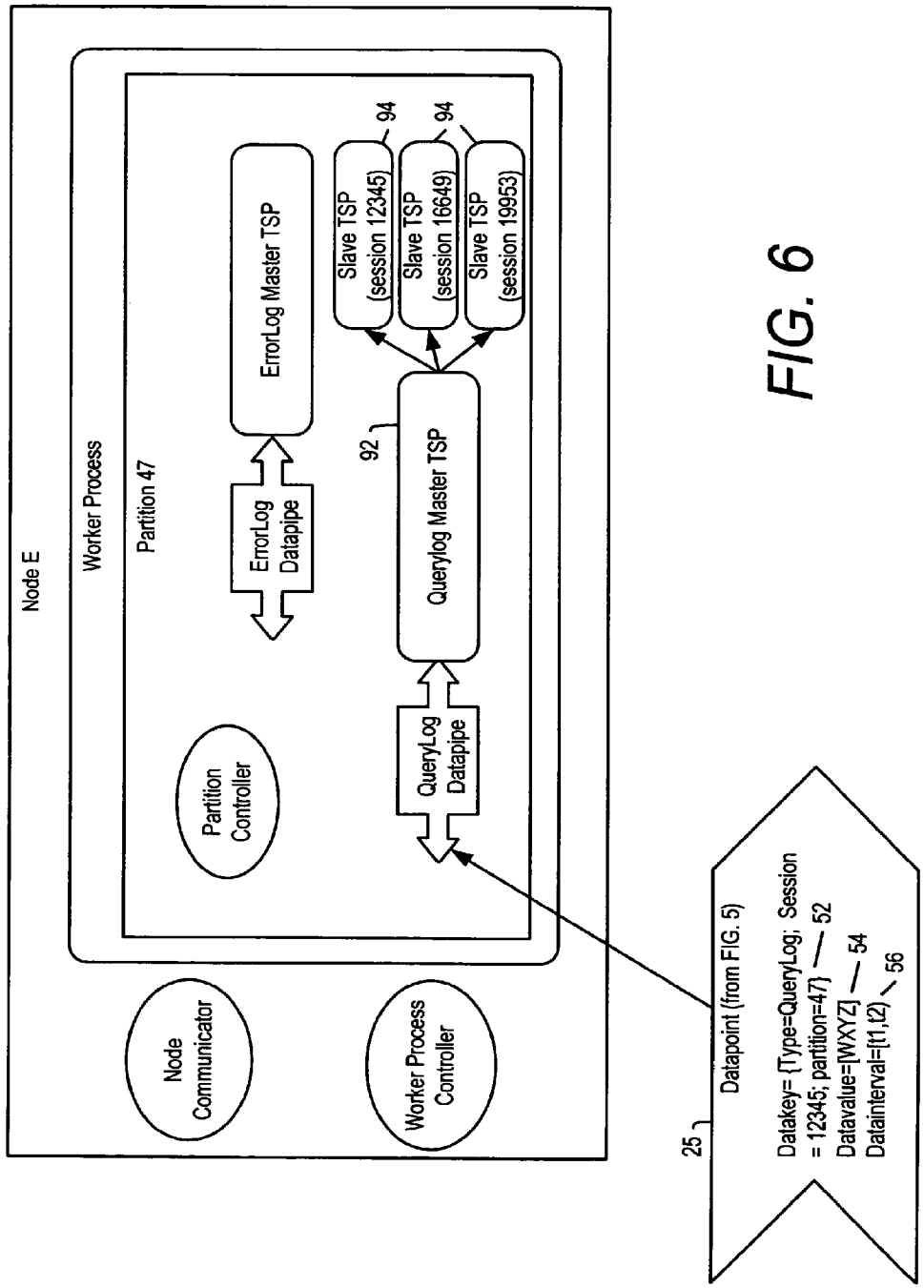
FIG. 6 is a block diagram showing an endogenous partition in greater detail.

Referring now to FIGS. 5-6, examples of partitions are shown in greater detail. In FIG. 5, an exogenous partition 70 is shown in greater detail. The exogenous partition 70 comprises a partition controller 62 and a set of datapipe-time-series processor pairs 64, as previously described. In the case of the exogenous partition 70, the datapipe is a querylog datapipe 76 and the time-series processor is an exogenous data master time-series processor 78. The exogenous partition 70 also comprises an errorlog datapipe 86 and an errorlog master time-series processor 88 which may be used for error handling.

It may be noted that the data message 25 received at the partition 70 does not include a partition number in the datakey 52. Rather, as previously mentioned in connection with FIG. 2, the node communicator 55 may calculate the partition number (or partition numbers) based on a data element in the datakey 52 that allows the data message to be uniquely distinguished from other data elements. (As described above, if the datapoint is used as input to multiple calculations, then the datapoint may be routed to multiple partitions 70.) For example, in the context of FIG. 5, the session ID may be applied to a hash function (or other mathematical function) to derive a partition number. This can ensure that the data messages from a given session ID all end up at the same partition 60, regardless which node 27 originally receives the data message. As a result, it is not necessary for the computers 12 to know which partition of the system 26 is the proper recipient of the data message. Other data may also be used to perform the sorting. The data message may be sorted when it arrives based on the datakey 52. As previously noted, the particular mechanism used to generate a partition number (which data element is used, what mathematical computation is applied to that data element, and so on) may be specified by the calculation descriptor. For example, the calculation table 48 may be accessed to determine the calculations for which the datapoint serves as an input and, for those calculations, to determine the mechanism to be used for generating a partition number. In another embodiments, the information may be stored at the node communicator 55 or may be part of the information that is stored with the datakey 42.

In addition to being forwarded to another node 27, data messages that are received in the exogenous partition 70 of FIG. 5 are also logged in a message journal 79. In an exemplary embodiment, a message journal 79 may be maintained at each of the nodes 27 and may be used to log exogenous data messages received at that respective node.

In FIG. 6, one of the endogenous partitions 60 is shown in greater detail. Given that the partition 60 is not the exogenous partition and is not configured to receive exogenous data messages, the datapoint 25 received by the partition 60 includes a partition number and is routed directly to the correct partition. The partition 60 comprises a querylog master time-series processor 92 and a plurality of slave time-series processors 94. Because multiple session IDs may hash to the same partition number, the same partition 60 may be processing time-series data from multiple sessions. Accordingly, separate slave time-series processors 94 are created to separately process the time-series data from each session. The time-series data is sorted based on the session ID, which is maintained intact (i.e., in addition to being hashed to generate the partition number), thereby allowing the time-series data to be forwarded to the correct slave time-series processors 94.

In an exemplary embodiment, other types of partitions may also be provided. For example, internal control partitions (not shown) may also be provided that receive and process control message datapoints. For example, each worker process 54 may have a control partition to receive and process control datapoints. The control partition may include a calculation management datapipe-time-series processor pair that performs meta-calculations regarding calculations to be performed. For example, if a user computer transmits a datapoint which includes calculation specification information describing a calculation to be performed, the datapoint may be received and processed by the control partition. The control partition may then add a calculation descriptor to the calculation table based on the calculation specification. Thereafter, when data arrives that should be provided to the new calculation, the calculation table 48 may be examined to determine how the datapoint should be handled, as described above.

In an exemplary embodiment, a worker process 54 can be started anywhere, not just on the particular node 27 that ultimately hosts the worker process 54. For example, the worker processes 54 may be capable of being created on one computer and then subsequently joining one of the nodes 27.

For example, a worker process 54 may be created on one of the user computers 18 and may subsequently join a node 27. This may, for example, be used for debugging. A worker process 54 may be created on a laptop computer and then attached to a production node 27.

B. Calculation Table

Figure 7A:
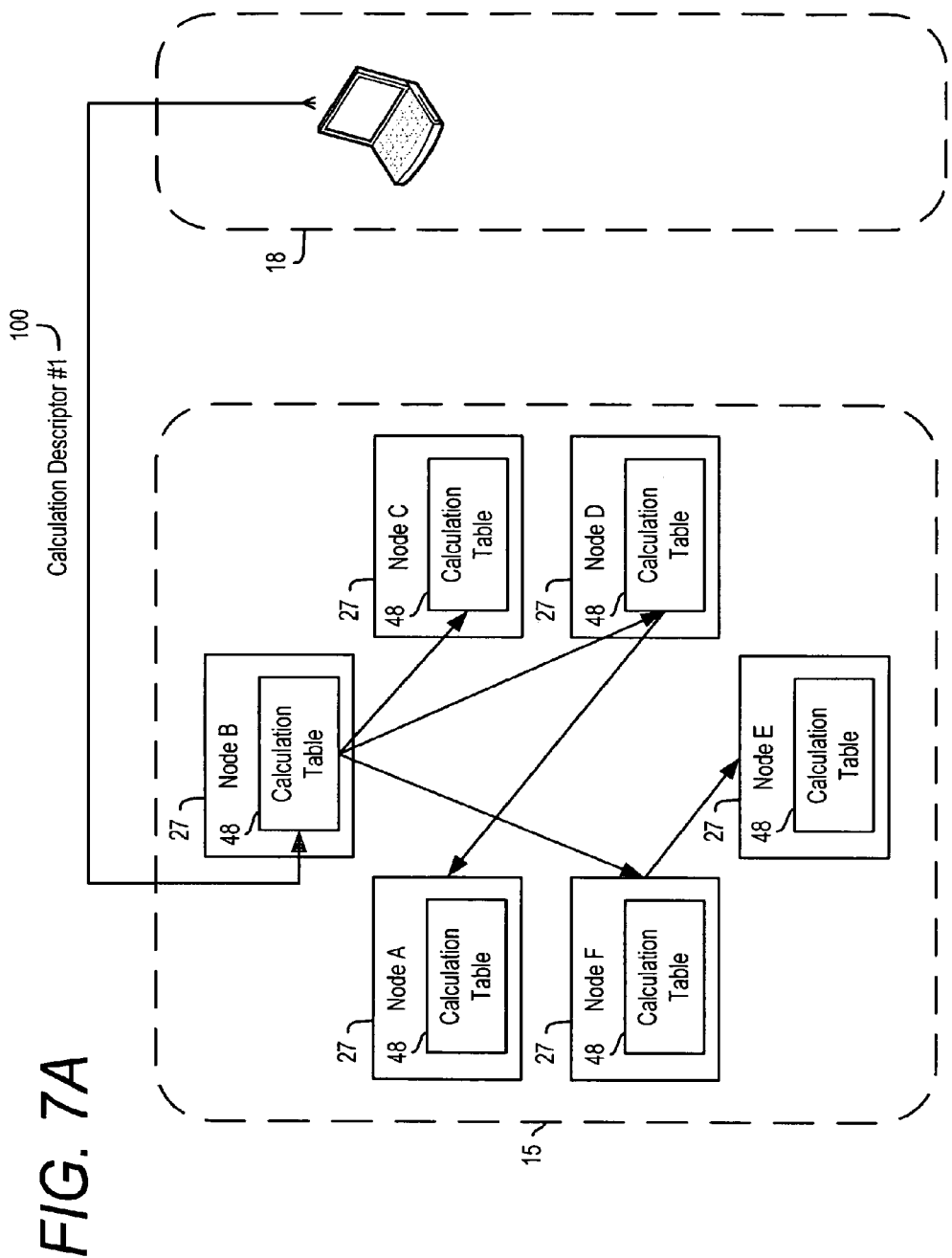
FIGS. 7A-7B are block diagrams showing a manner in which calculation descriptors are added to a calculation table for the system of FIG. 2.
Figure 7B:
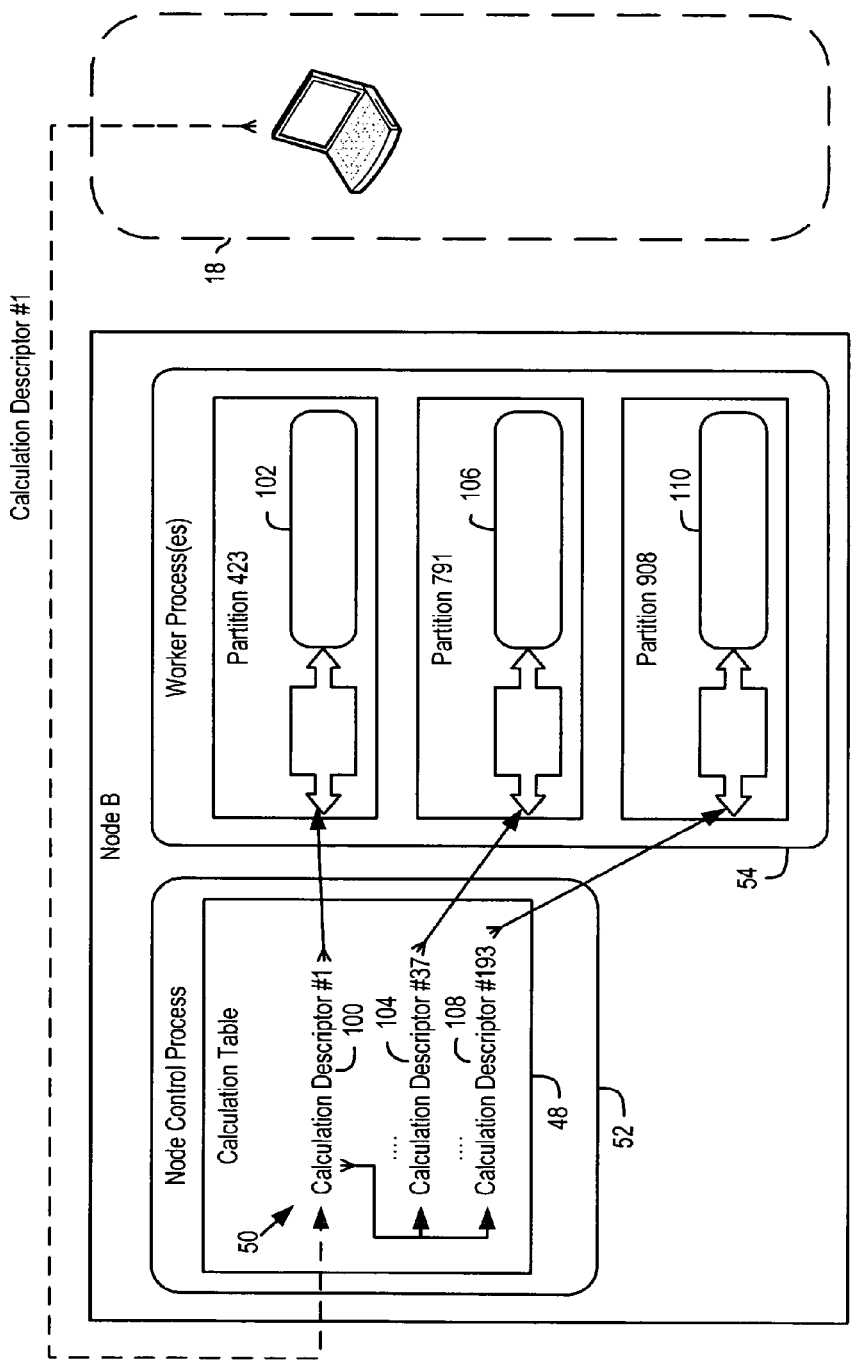

Referring now to FIGS. 7A-7B, operation of the calculation table 48 and the calculation descriptors is described in greater detail. As previously mentioned in connection with FIG. 1, the calculation table 48 specifies the current set of outputs that are required at any given time. The calculation table 48 drives operation of the system 26. The calculation table 48 comprises of a list of calculation descriptors 50 representing desired outputs.

As shown in FIG. 7A, a user computer 18 may be used to specify the processing to be performed by the system 26 by inserting a calculation descriptor (calculation descriptor #1) 100 in the calculation table 48. In an exemplary embodiment, the user computer 18 transmits a datapoint which includes calculation specification information useable to create a calculation descriptor. In an exemplary embodiment, users may be provided with a library of generic pre-programmed time-series processor functions from which to choose, e.g., in a manner somewhat akin to how users of conventional spreadsheets may be provided with a library of common functions that may be performed on data in the spreadsheet. Upon selecting one of the generic time-series processor functions, a user may then be prompted to provide additional information, such as data inputs (e.g., a time interval over which the user wishes the time-series processor function to operate, a session ID upon which the user wishes the time-series processor function to operate, and so on), the type of output datapoint to be generated, or any other information that may be used to customize the time-series processor function for use in a given situation. The library of generic time-series processor functions may be large enough to include enough time-series processor functions to cover the various operations that a user may wish to be performed. As will be appreciated, the user may also be provided with the ability to program custom time-series processor functions by modifying existing time-series processor functions or by programming entirely new time-series processor functions.

In order to insert the calculation descriptor 100, the user computer 18 connects to one of the nodes 27. For example, the calculation descriptor (e.g., or information useable to create the calculation descriptor) 100 may be received at the exogenous partition 70 of the node 27, e.g., as a datapoint by an exogenous datapipe that is configured to receive calculation descriptors. In an exemplary embodiment, as previously indicated, the user computer 18 transmits a datapoint which includes calculation specification information useable to create a calculation descriptor. The calculation descriptor may then be created and inserted in the calculation table 48 by a worker process in an internal control partition of the system 26. In an exemplary embodiment, each of the node control processes 52 and each of the worker processes 54 within each of the nodes 27 has a copy of a calculation table 48. The different versions of the calculation table 48 may, for example, be kept eventually consistent using a gossip protocol. Accordingly, when the calculation descriptor 100 is received at one node 27, it may subsequently be propagated to other nodes. The propagation of the calculation descriptor 100 to other nodes is shown in FIG. 7A.

In FIG. 7B, the manner in which the calculation descriptor 100 takes effect at a given node 27 is shown. The calculation descriptor 100 is received at the node control process 52 and forwarded to a worker process 54. Within the worker process 54, the worker process controller 59 forwards the calculation descriptor to each partition controller 62 (see FIG. 4). The partition controller 62 instantiates a datapipe-time-series processor pair 102 configured to generate the output specified by the calculation descriptor 100. For exogenous partitions, the datapipe-time-series processor pairs 64 are constructed by the partition controller 62 in response to the insertion of a calculation descriptor in the calculation table 48. For endogenous partitions, the datapipe-time-series processor pairs 64 are constructed by the partition controller 62 in response to receipt of data to be processed. The datapipe-time-series processor pair 102 is instantiated based on a generic library of datapipes and time-series processors, and the appropriate object class is selected from the library and constructed based on information contained in the calculation descriptor 100 (e.g., information specifying the class used to perform the calculations, the data inputs, the type of output datapoint to be generated, and any other necessary information). The calculation descriptor may include information allowing the user to specify additional parameters for the output datapoint to be generated (e.g., a desired time interval, a desired customer ID, and so on).

All of the underlying data required to generate the output specified in the calculation descriptor 100 may not be directly available. Accordingly, as shown in FIG. 7B, the calculation descriptor 100 may be programmed to insert other calculation descriptors 104 and 108 as needed until all the data that is needed is available. The calculation descriptor 100 may include information about the data it needs to perform the specified calculation, thereby permitting the insertion of the other calculation descriptors 104 and 108 to be triggered. Again, the calculation descriptors 104 and 108 are propagated to other nodes 27, and the node control process 52 at each node 27 instantiates respective datapipe-time-series processor pairs 106 and 110 configured to generate the output specified by the calculation descriptors 104 and 108. This process repeats until a datapipe-time-series processor pair is created (pair 108 in FIG. 7) for which the required data input is exogenous data or is data that is already available elsewhere (e.g., in the data repository 20).

As previously indicated, for endogenous partitions, the datapipe-time-series processor pairs 64 are constructed by the partition controller 62 in response to receipt of data to be processed. For example, if a calculation descriptor is inserted in the calculation table 48 which causes log records to be indexed for visitors, the datapipe-time-series processor pair 64 constructed for processing data for a particular visitor is constructed when data is received relating to the particular visitor. Accordingly, depending on the calculation descriptor 100, it may not be necessary to instantiate a datapipe-time-series processor pair 102 at each node 27 in order to generate the desired output. For example, if the calculation descriptor 100 specifies a desired output that relates to the session ID of one particular visitor, then the calculations relative to that specific session ID may be carried out at one partition, as opposed to across many partitions on many nodes as would be the case if the calculation descriptor 100 specifies a desired output that relates to the session ID of many visitors. If the calculation descriptor specifies a particular hash algorithm which causes the datapoint to be routed to a particular partition at a particular node 27, then the other nodes 27 will not receive datapoints associated with that session ID and will not instantiate the particular datapipe-time-series processor pair 102.

In an exemplary embodiment, both general and specific calculation descriptors may be used. For example, a user may insert a calculation specification that specifies the calculation of all log records by hour for a particular session ID. The general calculation descriptor may be used for the overall calculation and the specific calculation descriptor may be used for each hourly calculation. To create a specific calculation descriptor, the general descriptor may be cloned and marked with the specific interval (e.g., 2:00 PM-2:59 PM). Because processing in exogenous partitions 60 is driven by the arrival of datapoints, the datapipe-time-series processor pair 64 may not be constructed until a datapoint arrives at a worker process 54. When a datapoint arrives, routing may be performed based on the information contained in the calculation table 48 for the specific calculation descriptor. As a consequence, datapoints for the specific interval (e.g., 2:00 PM-2:59 PM) are all routed to the same datapipe-time-series processor pair 64 for processing. Datapoints for the next interval (e.g., 3:00 PM-3:59 PM) may then be routed to a different datapipe-time-series processor pair 64 for processing.

Figure 11:
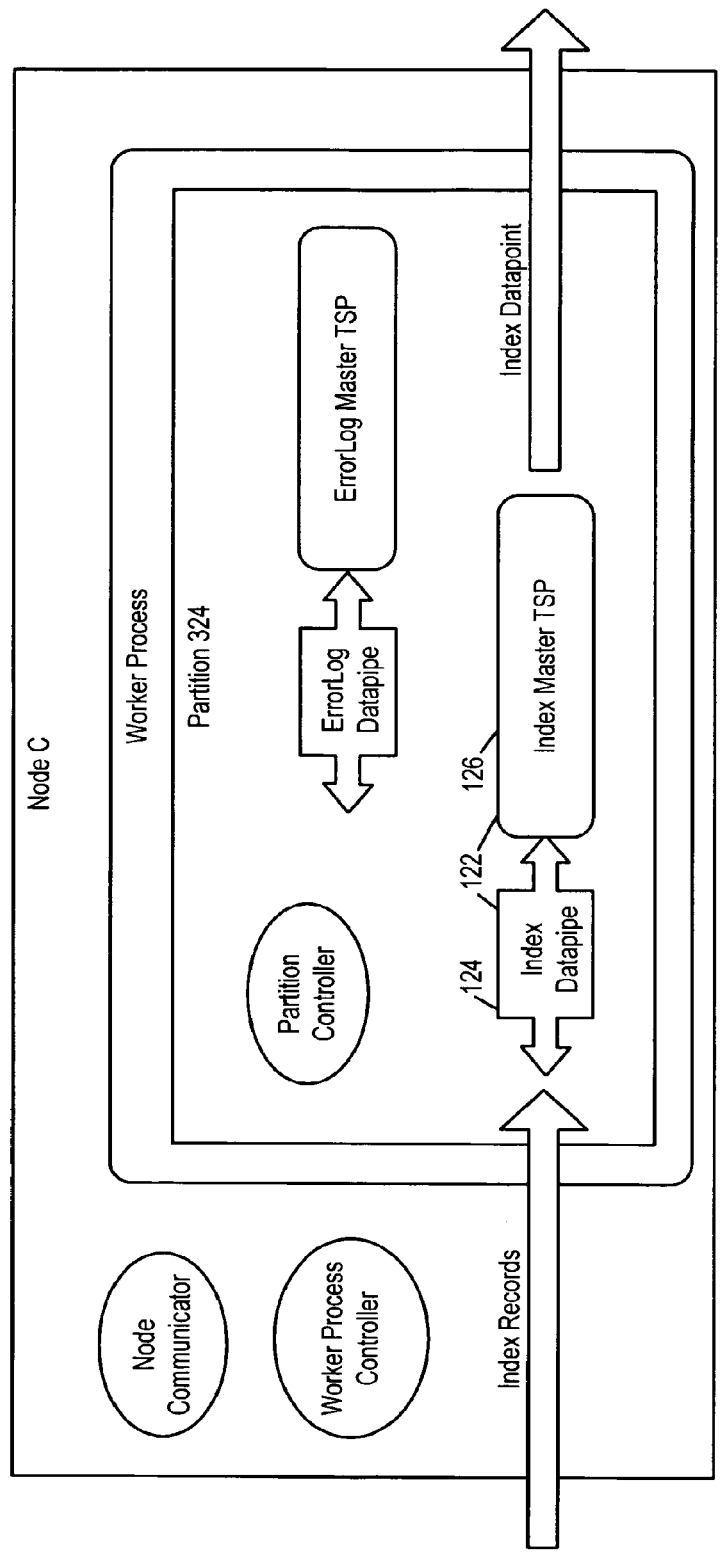
FIG. 11 is a block diagram showing an endogenous partition that indexes data received from data source computers in the system of FIG. 1.
Figure 12:
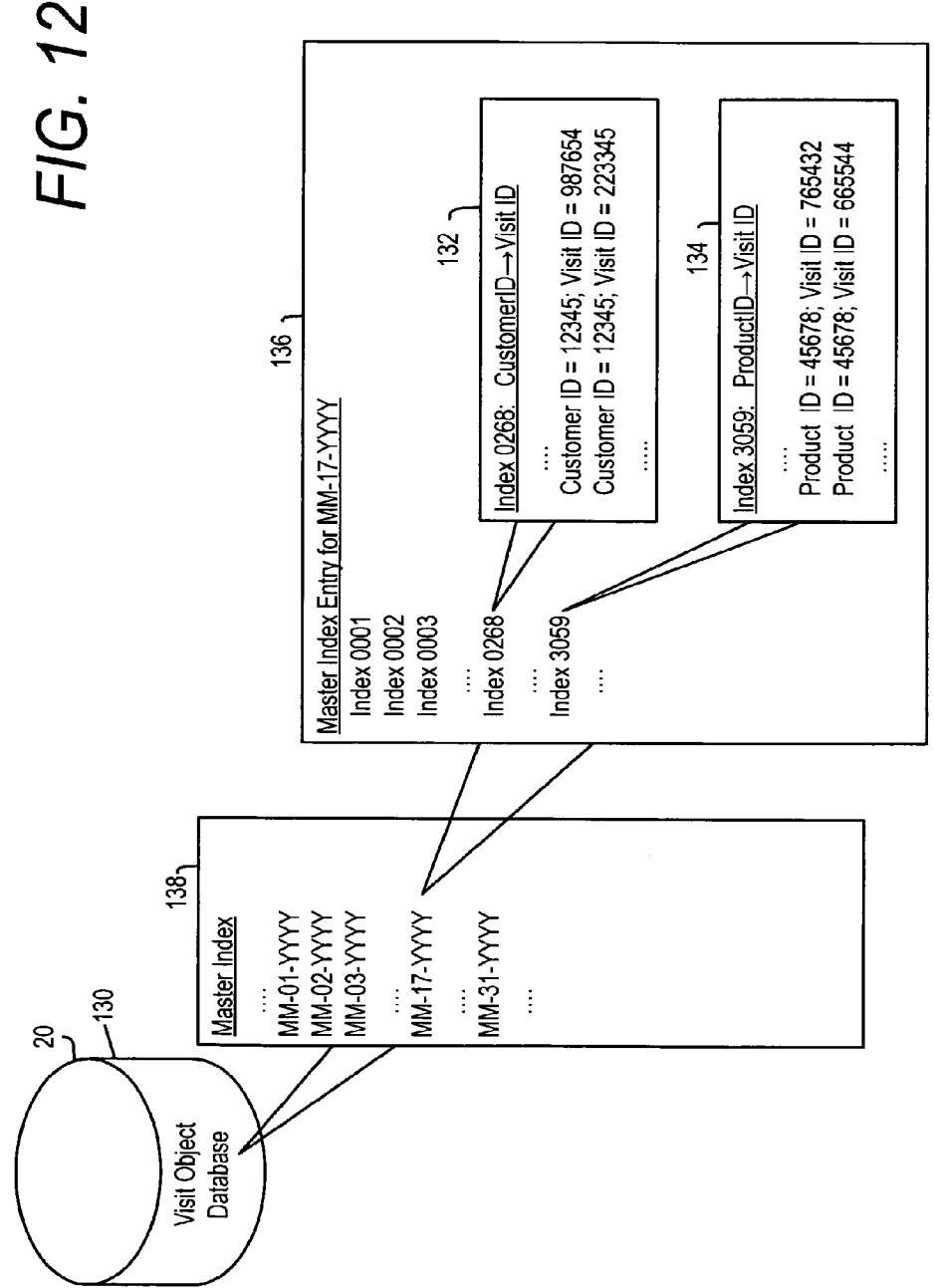
FIG. 12 is a block diagram showing an indexing scheme implemented in connection with the indexed data of FIG. 11.

Thus, the arrangement of FIG. 7A-7B provides a convenient mechanism for the user to access the datapoints collected by the data collection system 26. The user simply specifies the desired final output in the form of a calculation descriptor. Based on the calculation descriptor, the system 26 "backward chains" by inserting any additional calculation descriptors in the calculation table 48 and creating additional datapipe-time-series processor pairs as needed to compute precursor inputs used to generate the output specified by the user. The datapipe-time-series processor pairs already know what precursor inputs are needed to generate the outputs they are designed to generate. Accordingly, the precursor inputs may not need to be specified by the user. FIGS. 11-12 (discussed below) provide another example of this arrangement.

Additionally, in the arrangement of FIGS. 7A-7B, it may be noted that the computation for a particular problem may be specified in serial fashion but may automatically proceed in parallel. For example, a user may insert a calculation specification that specifies the calculation of all log records by hour for a group of session IDs. The system 26 is configured to decompose this calculation and spread it across many partitions 60 so that processing may occur in parallel. The parallelization may occur through a calculation (e.g., a hash operation) on a data element (e.g., a session ID, a visitor ID, a product ID, and so on) of the data in order to generate partition numbers which spread the incoming data across a partition-space. Thus, the parallelization of the calculation occurs in straightforward fashion by virtue of the architecture of the system 26 without the need to hand-code parallel algorithms.

Also, in an exemplary embodiment, each datapipe-time-series processor pair that is created is created responsive to the insertion of a specific calculation descriptor in the calculation table 48. As a result, when an output is generated by the datapipe-time-series processor pair, it is always known to whom the output should be forwarded (i.e., by virtue of who inserted the calculation descriptor in the calculation table 48). If the calculation descriptor was inserted by another datapipe-time-series processor pair, then the output is forwarded to that datapipe-time-series processor pair. On the other hand, if the calculation descriptor was inserted by one of the user computers 18, then the output is forwarded to the user computer 18 (or to another designated recipient).

As previously described, a datapipe-time-series processor pair 64 may be created that is configured to receive information useable to create calculation descriptors from the user computers 18. In an exemplary embodiment, a graphical user interface (GUI) application may be configured to provide a web-based interface to receive information useable to create calculation descriptors. The website may, for example, include instructions, on how to generate calculation descriptors, such that the calculation descriptors may specify virtually any calculation that may be conceived of by a user and for which the requisite precursor inputs are available from the data source computers 12.

III. Operation of Exemplary Data Collection/Analysis System

A. Log Record Collection and Processing

Figure 8:
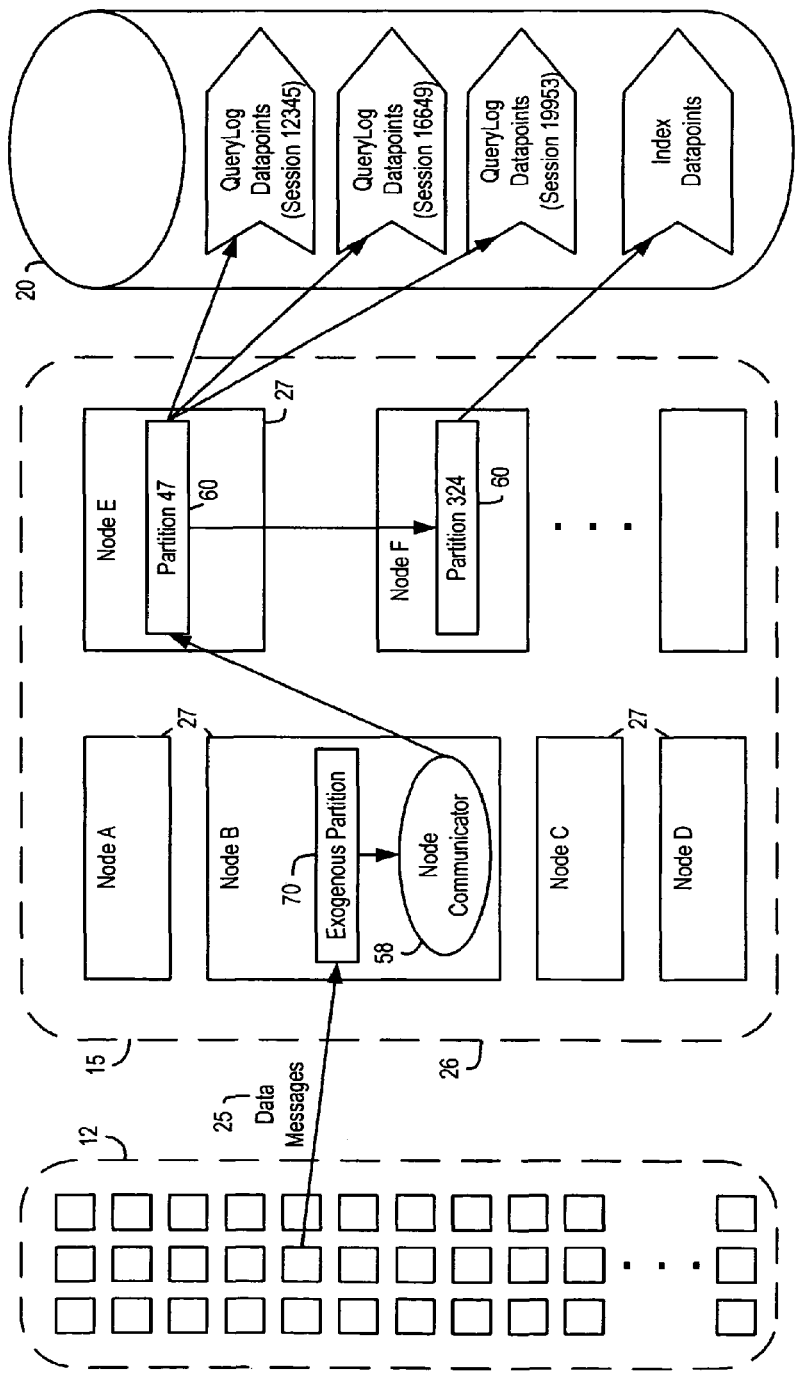
FIG. 8 is a block diagram showing data being collected and sorted in the system of FIG. 2.
Figure 9:
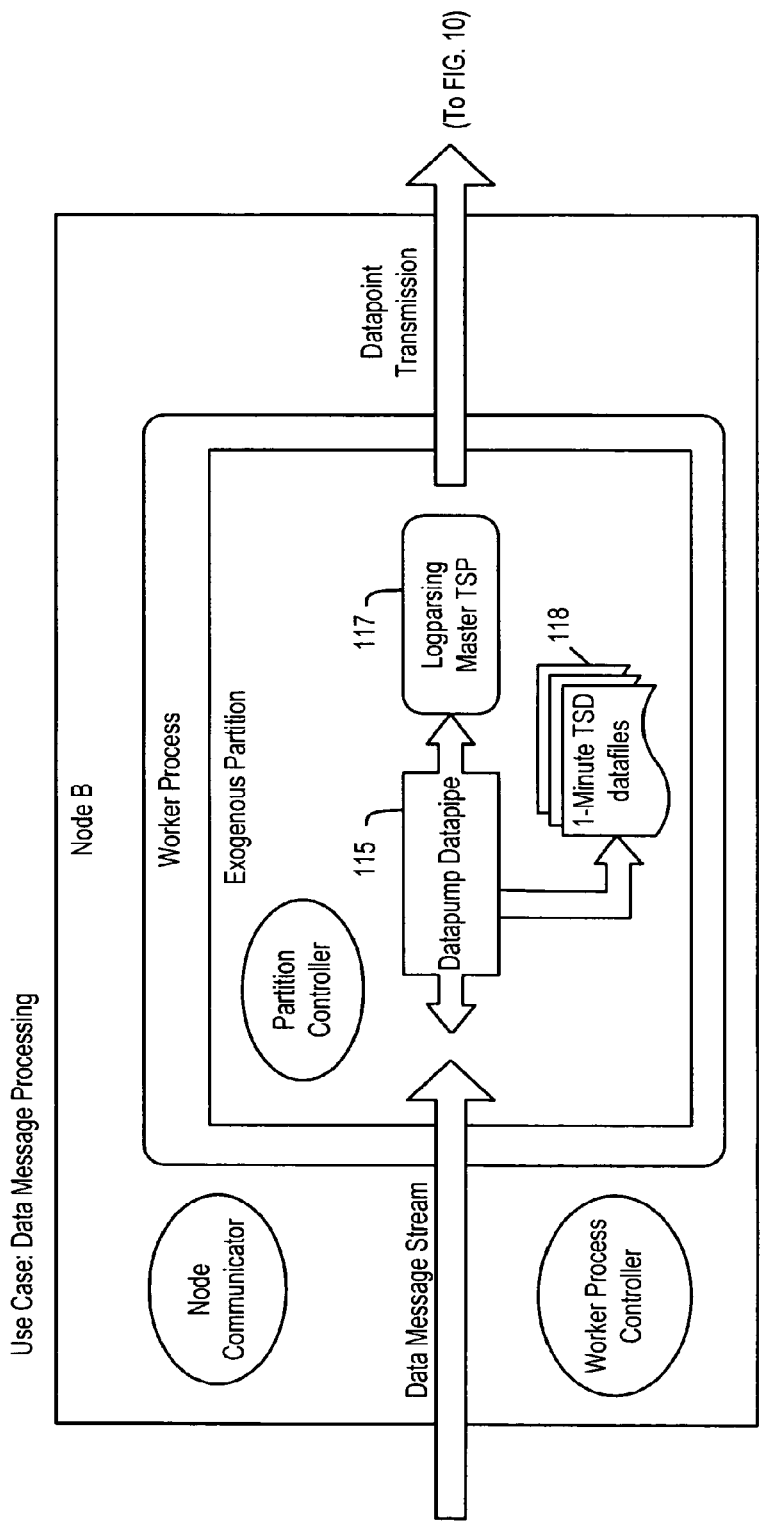
FIG. 9 is a block diagram showing receipt of data at an exogenous partition in an example in which the data is received in the form of a data stream.
Figure 10:
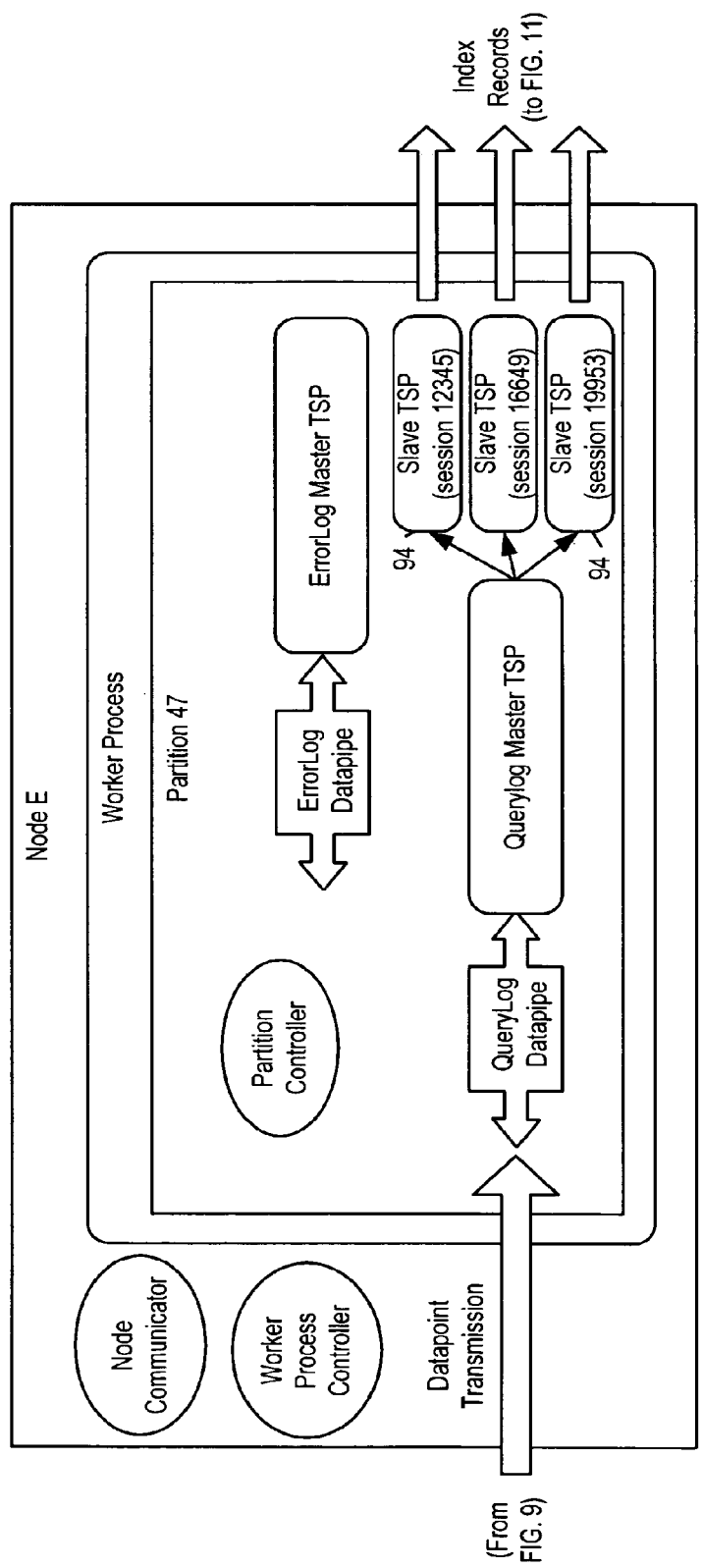
FIG. 10 is a block diagram showing an endogenous partition.

Referring now to FIGS. 8-10, a more specific example of the operation of the system 26 is provided. The example includes some of the features discussed in connection with FIGS. 1-7 as well as additional details related to the collection and processing of log records, e.g., querylog records. As previously indicated, querylog records may be generated during the operation of the computers 12 and may contain data concerning operation of the computers 12. For example, if the computers 12 host a website, and if each page that is rendered is considered to be a response to a visitor's query for information, then the querylog records may be records that log information concerning web pages rendered by the computers 12 in response to queries made by visitors. The contents of the querylog records may be determined by the manner in which the computers 12 are programmed. For example, system developers may be provided with the ability to include querylog statements in the program logic of the computers 12 which cause data specified by the developer to be saved in a querylog file and transmitted to the data collection system 26. Accordingly, if a developer considers it necessary or worthwhile to collect a particular piece of data, then a querylog statement may be added which causes the data to be included in the querylog file before the querylog file is transmitted to the data collection/analysis system 26. Thus, the querylog records may contain any data that it is desired to collect, store, and analyze, either historically or in real-time or both. Querylog records may be sent at periodic intervals or on an event-driven basis from the computers 12 to the data collection/analysis system 26, for example, each time a page is published, each time a particular task or set of tasks is completed, each time a particular quantity of data is collected, each time a particular notification is generated, and so on.

As also previously indicated, the computers 12 may, for example, comprise one or more clusters of servers which provide web pages to visitors of one or more on-line websites. In the context of the operation of a website, the querylog records may comprise information concerning the web pages provided to a visitor. In this context, a single querylog record may be produced each time a page is produced for a visitor (e.g., querylog records may be collected and then transmitted as a group when a web page is published). Alternatively, multiple querylog records may be produced for each page produced for a visitor. For example, one querylog record may be created to record business information, another querylog record may be created to record timing and other technical information, and so on. The querylog record(s) may, for example, contain enough information for the page to be identically recreated along with a time stamp indicating the time the page was published for the visitor. Any additional information that it is desired to be collected may also be included in the querylog, such as the amount of time to produce the page, the services that were called during production of the page, and so on.

Referring first to FIG. 8, FIG. 8 shows data messages being sent by one of the computers 12 to one of the nodes 27 in the data collection system 26. In the context of servers that are used to provide web pages to visitors of one or more websites, the number of computers that constitute what is designated as computers 12 in FIG. 1 may be large, as previously indicated. For example, the number of computers may be in the thousands, tens of thousands, or more. Given that the number of computers 12 is large, it may be considered more practical for the computers 12 to locate one of the nodes 27 rather than vice versa. Accordingly, in practice, the computers 12 may be configured to search at start-up for a node 27 to which to send querylog records. From the perspective of the data collection system 26, it is assumed that the needed data is flowing into the nodes 27. This assumption will be correct assuming the computers 12 have been properly programmed to send whatever data is needed by the data collection system 26. In other embodiments, the nodes 27 search out the computers 12 to locate and request the needed data.

Although the computer 12 that is sending data in FIG. 8 is shown as being connected to just one of the nodes 27, it will be appreciated that the connection between the computer 12 and the data collection system 26 may not be static. That is, any given computer 12 may establish new connections with a different node 27 when an existing connection with a prior node 27 is terminated. The existing connections may terminate when the prior node 27 becomes overloaded, when the prior node 27 fails, after a predetermined amount of time has passed (e.g., the system 10 may be configured such that the computers 12 seek to establish new connections at regular intervals), and so on. It will also be appreciated that the computer 12 may have more than one connection to the data collection system 26. For example, the computer 12 may have multiple connections to the same node 27 and/or may have other connections to other ones of the nodes 27.

The data messages from the computer 12 are received at the exogenous partition 70. Referring now also to FIG. 9, FIG. 9 shows processing of the data message at the exogenous partition 70. Data may be acquired from the computers 12 in various forms. For example, the data may be acquired as a datapoint which is in conformance with a message specification that is also conformed to by other messages processed by the data collection system 26. As another example, the data may be acquired as historical data from a database. As another example, the data may be acquired as a stream. The user computers 18 may be provided with the ability to program user-configured datapipes which are configured to receive data in a format known to the user and then convert the data into a datapipe. Different datapipes may then be constructed to handle each of these different scenarios. Other datapipes may be constructed to handle other scenarios.

In the example of FIG. 9, it is assumed that the data is acquired in the form of a stream. In this scenario, the exogenous partition 70 employs a user-configured datapipe 115, shown in FIG. 9 as having been assigned a name by a user as a "datapump" datapipe. The datapipe 115 is responsible for acquiring the data from the computer 12 and converting the data into datapoints. The datapipe 115 and a logparsing master time-series processor 117 (which understands the internal format of the files received from the computers 12) process the data stream from the computer 12. In the example of FIG. 9, the user has configured the datapump datapipe to create 1-minute time-series data files 118 based on the data stream. The 1-minute time-series data files 118 are then used to create datapoints. As shown in FIG. 8, the datapoints are then routed via the node communicator 58 to partition 47 which resides at Node E. The node communicator 58 determines the correct partition for the datapoint (e.g., by performing a hash of the session ID to compute the partition number). As previously described, the datapoint may be sent to multiple partitions if multiple calculation descriptors in the calculation table 48 specify the datapoint as a precursor input (e.g., where the datapoint is a precursor input for both a calculation relating to a particular session ID and for another calculation relating to a particular product ID, a hash may be respectively performed on the session ID and product ID and the datapoint may be routed to the resulting respective two partitions 60).

Referring now also to FIG. 10, FIG. 10 shows processing of the data message at the partition 47. As will be appreciated, a given one of the computers 12 may be publishing web pages to multiple visitors, and it may be desirable to keep the records for each visitor separate. Accordingly, at partition 47, the querylog datapoints are sorted by session ID and transmitted to slave processors 94, as discussed earlier in connection with FIG. 6. Partition 47 outputs multiple sets of datapoints corresponding to different ones of the sessions being handled by the computer (or computers) 12 that is sending data to node B. The datapoints are each stored in data repository 20, and an index record may then be generated indicating where the datapoint is stored. Alternatively, an index record may be generated indicating where collections of related datapoints are stored (e.g., the datapoints related to a particular session are stored together for a particular time interval, and the index record points to the datapoints for the particular time interval of the particular session as a group).

Referring now also to FIGS. 11-12, it may be desirable to index the data that is collected, sorted, and processed in FIGS. 8-10. As shown in FIG. 8, the index record datapoints from partition 47 may be forwarded to another partition 60 for the creation of indices. The indexing arrangement supported by the data collection system 26 operates in the same manner as described above in connection with other aspects of the system 26: Time-series processors may be used to create, as output datapoints, a time-series of datapoints that index other datapoints received by the time-series processor over a time period. Thus, as shown in FIG. 11, the partition may comprise an indexing pair 122 comprising a datapipe 124 and an indexing time-series processor 126. The output of the time-series processor 126 is an indexing datapoint which may be used to create an index 132 or 134 as shown in FIG. 12. In an exemplary embodiment, the index is created using, for example, a Bloom filter. In such an arrangement, the Bloom filter and may be used to create an index that is lossy but that requires less storage space.

Referring now to FIG. 12, the indexing pair 122 may be used in connection with a database service 130. In an exemplary embodiment, the database service 130 is a visit-object database service that is capable of providing visit-object and visit metadata objects as a function of visit ID. A visit-object is a data object encapsulating an uninterrupted series of web pages with a single session Id. (For purposes of the present example, a "visit" is distinguished from a "session" in that a session may span several visits. For example, for a visitor that visits a web site several times over a one month period, several visit IDs may be generated whereas only a single session ID is generated. A particular visitor may have the same session ID for as long as they can be identified (e.g., using cookies).) A visit metadata object is an object that is derived from querylog records and any other pertinent records that encapsulates useful meta-information about a visit, such as the customer Id, session Id, product IDs for the products viewed, and so on. The visit-objects and visit metadata objects may be generated as datapoint outputs of the data collection system 26 and stored in the database service 130. The interval of a visit is the interval between the extremes [min, max) of the intervals of the component pages published during the visit. A known length of time, such as five minutes, may be used as a timeout to determine when a visit has ended after a period of inactivity. The database service 110 is capable of receiving a visit ID and, in response, providing visit-objects and visit metadata objects for the visit associated with the visit ID.

The indexing pair 122 may be used to create an index such as index 132 or index 134 which may be used to access the database service 130. In the simplest example, the index created by the indexing pair 122 is a one-dimensional index. Thus, for example, index 132 may be used to return visit IDs as a function of customer IDs. That is, if a given customer ID is known, the index 132 may be used to return a list of visit IDs associated with the customer ID. As another example, index 134 may be used to return visit IDs as a function of product ID. That is, if a given product ID is known, the index 134 may be used to return a list of visit IDs associated with the product ID (e.g., visits in which the detail page for a product having the given product ID was viewed). The visit IDs may then be used to access the visit-objects and visit metadata objects in the database service 130.

Although the illustrated examples involve a one-dimensional index, it will be appreciated that multi-dimensional indices may also be constructed. For example, continuing with the above examples, an index may be created in which visit IDs are returned as a function of customer ID and product ID. Thus, if it is known that a particular customer viewed the detail page for a particular product, the customer ID and the product ID could be provided to the index to obtain an identification of the visit ID for the visit in which the particular customer viewed the particular detail page. Further, although the illustrated example involves a database service 130 that stores visit-objects and visit metadata objects, both of which are generated based on datapoints stored by the data collection system 26, it will be appreciated that a database service may be used to store other types of data objects and datapoints.

Thus, the indexing pair 122 may be used to create any N-dimensional index of datapoints. Indices may potentially be maintained along every dimension of incoming data (or computed data). "Potentially" because only dimensions that are specifically included in a calculation descriptor for an indexing datapoint are computed and preserved. The decision about what dimensions are indexed is not fixed but rather may be made at any time whenever a calculation descriptor for an indexing datapoint is inserted into the calculation table 48. The indexing pair 102 is thus able to provide a view into whatever set of dimensions is of interest to the querying user.

Further, the indexing arrangement used may vary from data type to data type. Indexing may be performed using domain-specific logic. For instance, grouping all page views within a single visit may be desirable in the context of implementing a page history service that allows historical information concerning web pages provided to visitors to be obtained. Similarly, grouping all webservices requests by a particular subscription Id may be desirable in the context of web-based services that are provided on-line. Different indexing arrangements may be used in different contexts. The data collection system 26 permits indexing (and querying) of clusters of information in a differentiated manner. Multiple indices may be created "on demand" responsive to the insertion of calculation descriptors in the calculation table 48.

Once the indices 132 and 134 and other similar indices are generated (e.g., using various incarnations of the indexing pair 122), the indices may be assembled in an entry 136 in a top-layer master index 138, e.g., on an hourly, daily, weekly or other basis. The master index 138 is constructed as a function of time (e.g., in the illustrated embodiment, with a one day time-granularity). The master index 138 is an index of daily indices and comprises a list of daily indices that may each be accessed individually. At the end of each day, that day's daily indices are stored as datapoints in the data repository 20 and new indices are started. The master index 138 grows by one entry per day (or other convenient time duration).

This arrangement provides a convenient mechanism for accessing data collected by the data collection system 26. For example, a customer service representative for an on-line web site may wish to view the pages provided to a visitor during a certain five day period. To view these pages, the representative first finds the customerID→visitID index entry in the master index 138 for each of the five days of interest. The customer service representative may then obtain visit IDs for the visitor for each of the five days in question by accessing the customerID→visitID index 132 for each of those days. Using the visit-objects for that visitor for those days, the customer service representative may then view the web pages published to the visitor on those days.

It may also be noted that indices may be created in substantially real time as data from the data source computers 12 is received or they may be created during a historical analysis. In the above example, log records are arriving from the data source computers 12 and are being processed by the datapipe-time-series processor pairs 64. As the log records are processed, the index datapoints are generated. Thus, the data from the data source computers 12 is sorted and indexed substantially in real time; the rate at which the index is assembled at approximately the same rate at which new data to be indexed is arriving. The indexing pair 122 is at work building the index even as new data is coming in from the data source computers 12.

The index may also be created during historical analysis. Indices may be built based on datapoints retrieved from the data repository 20. Except for the source of the datapoints, the indexing operation is the same. As previously mentioned, using a datapipe and time-series processor which are separate decouples the issue of what to process (and where the data comes from) from the issue of how to process the data.

Referring again to FIG. 7, an index may be created by inserting a calculation descriptor in the calculation table 48. By way of example, to create an index of querylog records, the user may specify the desired index in a calculation descriptor. If the calculation descriptor specifies an index of querylog files, the indexing datapipe-time-series processor pair knows that it needs querylog files to perform the indexing. Accordingly, another calculation descriptor is added to the calculation table 48 which causes querylog files to be collected. Since querylog files are collected directly from the data source computers 12 (or from the data repository 20, in the case of a historical inquiry), no additional precursor inputs need to be calculated. Any additional information (e.g., specifying that the querylog files should pertain to a particular customer ID) may be included as a parameter of the calculation descriptor and will be passed along to the querylog datapipe-time-series processor pair, so that only querylog files for the particular customer ID are collected.

B. Notifications

Figure 13:
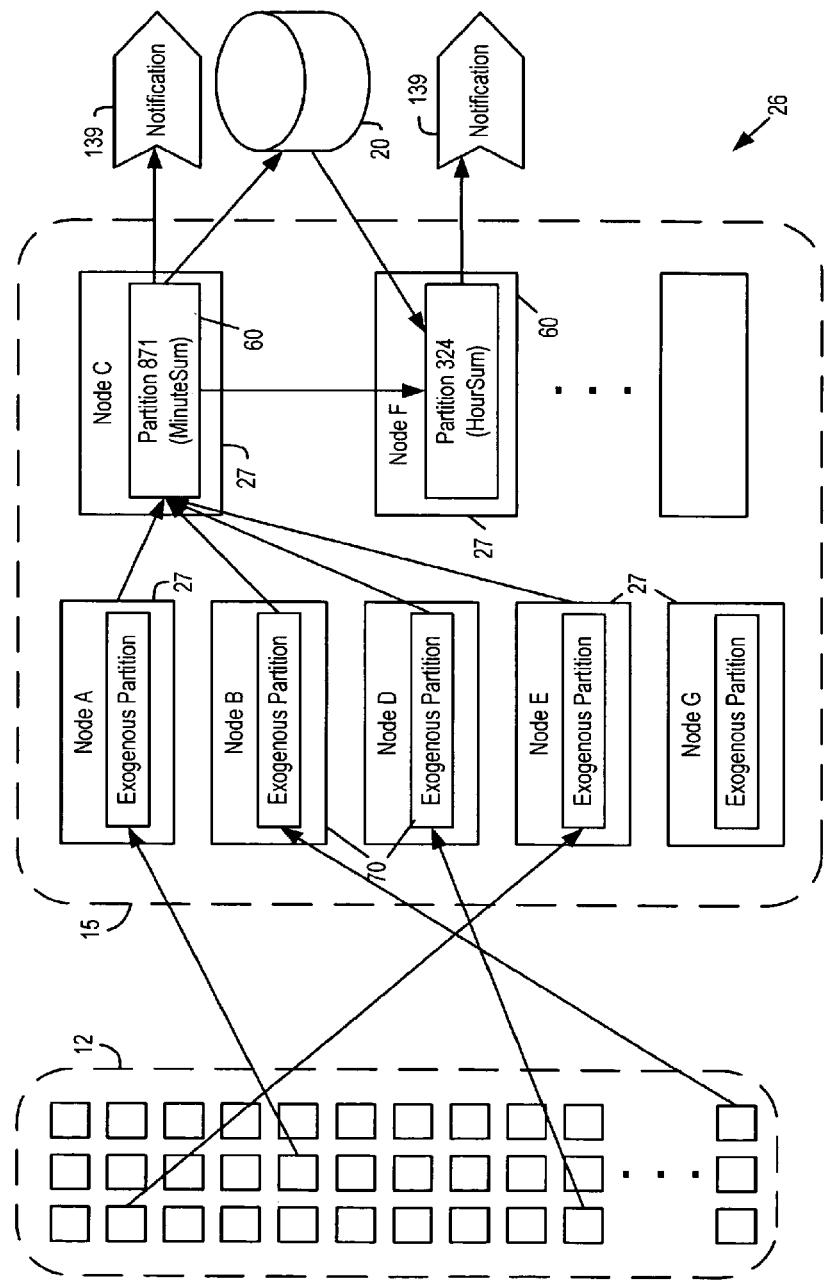
FIG. 13 is a block diagram showing operation of the system of FIG. 1 in connection with a web data service.

Referring now to FIG. 13, another example of the operation of the data collection system 26 is provided. In FIG. 13, the data source computers 12 may, for example, be used in connection with providing on-line web'service to subscribers. The service may provide data on demand to the subscribers (e.g., documents, portions of documents, streaming audio files, streaming visual files, and/or any other type of data). The service may also provide data processing for the subscribers (e.g., receive a block of data, process the block of data, and return another block of data as the output of the processing). Subscribers are assumed to be billed on a usage basis (bytes received and/or bytes delivered). It is also assumed that a subscriber may access the service from numerous computers (e.g., as in the case of a business subscriber with numerous employees, each with computers that may be used to access the service). In FIG. 13, there are four computers 12 that are shown to be generating usage data for the subscriber.

In order to collect usage information for the subscribers, each time one of the computers receives or transmits a message to the subscriber, it transmits a data message to the data collection system 26. For example, if one of the computers 12 transmits four documents to the subscriber, for each document, it transmits a data message to the data collection system 26 indicating that a file was sent and indicating the size of the file. If the data sent to the subscriber is a streaming audio/video file, the computer 12 may be configured to send a data message once per minute (or some other time interval) indicating the amount of data transmitted during the previous minute.

In operation, each of the computers 12 finds a node 27 which is available to receive data messages. As previously indicated, it is not necessary for the computer 12 to send the data message to the particular node 27 that is processing data for the subscriber of interest. Rather, due to the internal partitioning of the data collection system 26, the data message may be received at the exogenous partition of any node 27 and the data message will thereafter be forwarded to the correct recipient node 27 (Node C, in the example FIG. 13). At node C, multiple slave time-series processors may be running which are dedicated to different subscriber IDs. Accordingly, it may be necessary to sort incoming data messages based on subscriberID so that the data message arrives at the correct slave time-series processor (in generally the same manner as discussed in connection with the session IDs in FIG. 6). The slave time-series processor may maintain a running summation of the bytes received and/or bytes delivered. In an exemplary embodiment, this information is stored once-per-minute and a new summation begins. Historical analysis (not shown) may then be performed at the end of the month, for example, to generate billing information for the subscriber. For example, a calculation descriptor may be inserted in the calculation table 48 which creates a datapipe-time-series processor pair configured to obtain the per-minute summations from the data repository 20 and to compute an overall total. Of course, this computation could instead be performed in real time by inserting the calculation descriptor in the calculation table 48 while the data messages are still being received.

It may also be desirable to monitor current usage of the subscriber and to issue a notification 139 under certain circumstances. For example, it may be desirable to limit the bandwidth consumed by any one subscriber at a given time. A notification 139 may be issued to alert the computers 12 (in this case the users of the data collection system 26) when a bandwidth limit has been exceeded, thereby allowing the computers 12 to take action to limit or terminate the access of the subscriber.

Also shown in FIG. 13 at Node F is a partition configured to compute an hourly summation. It is possible to insert the calculation descriptor for this computation halfway through the time period of interest. For example, the calculation descriptor may specify performing the computation based on data starting one-half hour ago and continuing one-half hour into the future. The computation is then performed using both historical and real-time data.

IV. Example Use Cases

The system 10 may be used in a variety of different settings. For example, the system 10 may be used to collect and analyze data generated during operation of a website. For example, the data may relate to purchases, and the analysis may be performed to detect shifts in purchasing patterns or to detect hot products. For example, to detect hot products, the data may be sorted by product ID, and time-series processors may be created which output notifications when potential hot products are detected based on known time-series analysis techniques. Also, the user computers 18 may include computers responsible for submitting orders to suppliers. Thus, when a hot product is detected, orders for additional products can be submitted quickly to maximize the likelihood of order fulfillment (i.e., before the manufacturer is deluged with orders from other retailers, and/or by permitting the manufacturer to respond more quickly to unforeseen demand). As another example, visit data may be collected and analyzed to evaluate the effectiveness of new promotions and/or new techniques for selling products (e.g., product placement on the web page, other content displayed on the web page, and so on). As another example, data may be collected and analyzed to provide real-time website performance statistics collection as needed for a website management console, allowing product managers to analyze traffic and purchasing trends. As another example, data may be collected concerning shopping patterns and/or particular visits, for example, to allow a particular customer experience to be replayed. As another example, a backward-looking simulation may be performed for purposes of debugging, for example, to attempt to determine how the computers 12 operated in a past situation based on historical data.

As another example, the system 10 may be used to perform economic analysis. For example, to generate reports concerning consumer spending, the system 10 may be used to collect and analyze point-of-sale data. In this arrangement, the data source computers 12 may be point-of-sale terminals connected by way of the Internet or other suitable network to the data collection system 26.

As another example, the system 10 may be used to perform weather forecasting. The data source computers may be computers on-board weather satellites, computers at whether observations stations, and so. Models may be included in the system 26 which predict future weather patterns based on collected data. In this instance, the future weather patterns may be represented by internally-generated datapoints (i.e., datapoints generated by models). The datapoints may be timestamped in the future and designated as having been generated based on predictive models. As actual data is acquired, the datapoints generated based on models may be replaced with actual data, so that forecasts may be updated. Thus, the data processing and collection system 26 may operate both on predicted data and on actual data, and may transparently switch from predicted data to actual data as the actual data is acquired. Weather data and atmospheric composition data may also be used to analyze air temperature data to correlate air temperature with other factors, such as atmospheric composition data. Again, simulation may be performed either retrospectively or prospectively.

As another example, the system 10 may be used to analyze patient medical data, e.g., to detect outbreaks of epidemics based on medical treatment being given to patients based on reported diagnostic related groupings (DRG) codes for such patients. In this example, hospital information systems may serve as the data source computers 12. The data may be analyzed for sudden surges in certain types of treatments, and notifications may be issued when such surges are detected.

As another example, the system 10 may be used to monitor vehicle performance, driving habits, and traffic patterns. The data source computers may be automotive computers including engine controllers, transmission controllers, on-board positioning systems, and so on. As another example, the system 10 may be used to analyze data collected during business operations, such as data from a warehouse facility, to detect possible theft patterns. As another example, the movement of workers or packages through a warehouse facility in connection with preparing goods for shipping may be simulated, e.g., to determine the most efficient routing paths or scheduling in view of potentially random future events such as newly received orders, misplaced packages, scheduling changes, and so on. As actual events unfold, actual data associated with the actual events may be substituted for simulated data associated predicted events, so that updated routing paths or scheduling may be generated. Again, a seamless transition may be made from simulated data to actual data.

As another example, the system 10 may be used to monitor traffic patterns on the Internet. For example, data concerning internet traffic may be collected and analyzed to detect spam or to locate and monitor potential terrorist communications. As another example, the system 10 may be used to monitor data from surveillance cameras, package monitoring systems, and other systems used to detect potential terrorist threats for homeland security. As another example, the system 10 may be used to collect, sort, process and index real-time tracking information relating to the location of packages having a certain type of RFID tag (e.g., designating the package as containing a hazardous substance), and to issue event notifications when the location of a package becomes unknown or out of compliance with expectations. As another example, the system 10 may be used to collect and analyze data from physical experiments, such as particle physics experiments and drug experiments.

The invention has been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices (e.g., cell phones, personal digital assistants, portable music players, and so on), multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing devices in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented data collection and analysis method comprising:
   receiving, at a host computing device, at least one data analysis datapoint from a client computing device,
      wherein a data analysis datapoint comprises a data value corresponding to data to be processed and a data interval corresponding to a time interval associated with the data analysis datapoint,
      wherein the host computing device is one of a plurality of host computing devices configured to collect data from a plurality of client computing devices;
   adding the received at least one data analysis datapoint to a data structure, wherein the data structure comprises an index of data analysis datapoints, routing information for at least a portion of the data structure from one of the plurality of host computing devices to a requesting client computing device, and a set of calculation descriptors indicating data for performing data processing to obtain a data processing result;
   storing, in a data repository, the data structure;
   maintaining at least partially consistent copies of the data structure across the plurality of host computing devices;
   receiving an additional data analysis datapoint from the client computing device;
   generating the data processing result based at least in part on the data analysis datapoints and the set of calculation descriptors included in the data structure, the data processing result corresponding at least in part to adding the additional data analysis datapoint to the data structure, wherein the additional data analysis datapoint is to be used in connection with one of the data analysis datapoints in the index, wherein a portion of the additional data analysis datapoint is added to the data value; and
   in response to a request regarding an operation from the client computing device, providing the data processing result using the routing information to the client computing device.

2. The method of claim 1, wherein the received at least one data analysis datapoint is added to the data structure in the form of a plurality of calculation objects.

3. The method of claim 1, wherein the index of data analysis datapoints comprises a multi-dimensional index that indexes characteristics of a plurality of calculation objects.

4. The method of claim 3, wherein the characteristics of calculation objects comprise at least one of the data value, the data interval, a session identifier, or an identifier associated with a text string.

5. The method of claim 1 further comprising initiating processes on the plurality of host computers, wherein individual processes are initiated responsive to the addition of an additional data analysis datapoint to the data structure.

6. The method of claim 1 further comprising providing a library of process functions for generating the data processing result, wherein the process functions comprise at least one of a combination function, an addition function, or a publication function.

7. The method of claim 6 further comprising:
   receiving a user selection of one of the process functions; and
   processing the selected process function to generate a user view comprising data generated from the received at least one data analysis datapoint or the additional data analysis datapoint.

8. The method of claim 1, wherein providing the data processing result using the routing information to the client computing device comprises providing the data processing result on a web page to the client computing device.

9. The method of claim 1 further comprising providing a graphical user interface accessible to users to specify the at least one data analysis datapoint or the additional data analysis datapoint.

10. The method of claim 9, wherein the user interface is a web-based interface.

11. The method of claim 2, wherein a graphical user interface is configured to provide an interface to receive information corresponding to a calculation object of the plurality of calculation objects.

12. The method of claim 1 further comprising:
    decomposing the operation into operation components; and
    allocating the operation components across the plurality of host computing devices.

13. A system for collecting and analyzing data comprising:
    one or more computer processors;
    at least one computer memory accessible by at least one of the one or more computer processors;

a server computing device configured to execute one or more processes, the server computing device operable to:
- receive, from a client computing device, at least one data analysis datapoint,
  - wherein a data analysis datapoint comprises a data value for processing,
  - wherein the server computing device is one of a plurality of host computing devices configured to collect data from a plurality of client computing devices;
- aggregate the received at least one data analysis datapoint in a data structure,
  - wherein the data structure comprises an index of data analysis datapoints, routing information for at least a portion of the data structure from one of the plurality of host computing devices to a requesting client computing device, and a set of calculation descriptors indicating data for performing data processing to obtain a data processing result;
- receive, at the server computing device, an additional data analysis datapoint;
- store, in a data repository, the data structure;
- maintain at least partially consistent copies of the data structure across the plurality of host computing devices;
- generate the data processing result based at least in part on the at least one data analysis datapoint and the set of calculation descriptors included in the data structure, the data processing result corresponding at least in part to combining the additional data analysis datapoint within the data structure, wherein the additional data analysis datapoint is to be used in connection with one of the data analysis datapoints in the index of data analysis datapoints, wherein a portion of the additional data analysis datapoint is to be combined with the data value; and
- in response to a request regarding an operation from the client computing device, provide the data processing result using the routing information to the client computing device.

14. The system of claim 13, wherein aggregating the received at least one data analysis datapoint in the data structure comprises aggregating the received at least one data analysis datapoint in the data structure as a plurality of calculation objects.

15. The system of claim 13, wherein providing the data processing result using the routing information to the client computing device comprises providing the data processing result to the client computing device using at least one of a web page or a graphical view.

16. The system of claim 13, wherein the server computing device is further operable to:
provide a user interface for specifying the at least one data analysis datapoint or the additional data analysis datapoint.

17. The system of claim 13, wherein the received at least one data analysis datapoint are indexed in the data structure as received from the client computing device.

18. A non-transitory computer readable medium storing instructions for data analysis and collection which, when executed, cause a processor to at least:
- receive, at a host computing device, at least one data analysis datapoint from a client computing device,
  - wherein a data analysis datapoint comprises a data value for processing,
  - wherein the host computing device is one of a plurality of host computing devices configured to collect data from a plurality of client computing devices;
- aggregate the received at least one data analysis datapoint in a data structure, wherein the data structure comprises an index of data analysis datapoints routing information for at least a portion of the data structure from one of the plurality of host computing devices to a requesting client computing device, and a set of calculation descriptors indicating data for performing data processing to obtain a data processing result;
- maintain at least partially consistent copies of the data structure across the plurality of host computing devices;
- receive, at the host computing device, an additional data analysis datapoint;
- generate the data processing result based at least in part on the at least one data analysis datapoint and the set of calculation descriptors included in the data structure, the data processing result corresponding at least in part to combining the additional data analysis datapoint within the data structure, wherein the additional data analysis datapoint is to be used in connection with one of the received at least one data analysis datapoint in the data structure, wherein a portion of the additional data analysis datapoint is to be combined with the data value; and
- in response to a request regarding an operation from the client computing device, provide the data processing result using the routing information to the client computing device.

19. The non-transitory computer readable medium of claim 18, wherein aggregating the received at least one data analysis datapoint in a data structure comprises aggregating the received at least one data analysis datapoint in the data structure as a plurality of objects.

20. The non-transitory computer readable medium of claim 18, wherein the instructions further cause the processor to at least:
provide a library of processes for generating the data processing result regarding at least one of the received data analysis datapoints or the additional data analysis datapoint.

21. The non-transitory computer readable medium of claim 20, wherein the processes for generating the data processing result comprise at least one of a combination process, an addition process, and a web page publication process.

* * * * *